United States Patent
Maeda et al.

(10) Patent No.: US 7,909,416 B2
(45) Date of Patent: Mar. 22, 2011

(54) VEHICLE BRAKING/DRIVING FORCE CONTROL APPARATUS

(75) Inventors: Yoshinori Maeda, Aichi-ken (JP); Kazuya Okumura, Suntou-gun (JP); Michitaka Tsuchida, Susono (JP); Yoshio Uragami, Mishima (JP); Kensuke Yoshizue, Susono (JP); Satoshi Ando, Fuji (JP); Koji Sugiyama, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 740 days.

(21) Appl. No.: 11/817,517

(22) PCT Filed: Feb. 24, 2006

(86) PCT No.: PCT/JP2006/304026
§ 371 (c)(1),
(2), (4) Date: Aug. 31, 2007

(87) PCT Pub. No.: WO2006/093244
PCT Pub. Date: Sep. 8, 2006

(65) Prior Publication Data
US 2009/0236905 A1   Sep. 24, 2009

(30) Foreign Application Priority Data

Mar. 1, 2005  (JP) .................................. 2005-056499

(51) Int. Cl.
*B60T 8/32* (2006.01)
(52) U.S. Cl. .......................................... 303/146; 701/70
(58) Field of Classification Search .................. 303/140, 303/146; 701/70–72, 91
See application file for complete search history.

(56) References Cited

U.S. PATENT DOCUMENTS

| | | | |
|---|---|---|---|
| 5,702,165 A * | 12/1997 | Koibuchi | 303/146 |
| 6,442,469 B1 * | 8/2002 | Matsuno | 701/70 |
| 6,584,397 B2 * | 6/2003 | Tanaka et al. | 701/70 |
| 6,704,622 B2 * | 3/2004 | Tinskey et al. | 701/1 |
| 7,168,769 B2 * | 1/2007 | Nihei et al. | 303/140 |
| 7,584,042 B2 * | 9/2009 | Suzumura et al. | 701/70 |

(Continued)

FOREIGN PATENT DOCUMENTS

JP      5 24522      2/1993

(Continued)

OTHER PUBLICATIONS

U.S. Appl. No. 11/916,073, filed Nov. 30, 2007, Uragami, et al.

(Continued)

*Primary Examiner* — Christopher P Schwartz
(74) *Attorney, Agent, or Firm* — Oblon, Spivak, McClelland, Maier & Neustadt, L.L.P.

(57) ABSTRACT

According to the present invention, when at least one of a target braking/driving force and a vehicle target yaw moment required to a vehicle cannot be achieved by a braking/driving forces of wheels, a target braking/driving force after a modification and a target yaw moment after a modification are calculated to be values attainable by the braking/driving forces of the wheels. When the magnitudes of the target braking/driving force after a modification and the target yaw moment after the modification exceed the corresponding limit value, these magnitudes are limited to the limit values. Alternatively, when the magnitudes of rates of change of the target braking/driving force after a modification and the target yaw moment after the modification exceed the corresponding limited rates of change, these magnitudes of the rates of change are limited to the limited rates of change.

20 Claims, 17 Drawing Sheets

U.S. PATENT DOCUMENTS

| | | | |
|---|---|---|---|
| 7,676,314 B2 * | 3/2010 | Kato et al. | 701/72 |
| 2003/0149515 A1 * | 8/2003 | Hessmert et al. | 701/29 |
| 2004/0158377 A1 * | 8/2004 | Matsumoto et al. | 701/48 |

FOREIGN PATENT DOCUMENTS

| | | |
|---|---|---|
| JP | 8 310366 | 11/1996 |
| JP | 9 309357 | 12/1997 |
| JP | 2000 168525 | 6/2000 |
| JP | 2000 190832 | 7/2000 |
| JP | 2000 344077 | 12/2000 |
| JP | 2002 46589 | 2/2002 |
| JP | 2002 178904 | 6/2002 |
| JP | 2002 211378 | 7/2002 |
| JP | 2003 341493 | 12/2003 |
| JP | 2005 255107 | 9/2005 |
| RU | 2 108 247 C1 | 4/1998 |
| RU | 2212348 C2 | 9/2003 |
| WO | WO 00/21774 | 4/2000 |

OTHER PUBLICATIONS

U.S. Appl. No. 12/097,629, filed Jun. 16, 2008, Meada, et al.

* cited by examiner

VEHICLE BRAKING/DRIVING FORCE CONTROL APPARATUS

TECHNICAL FIELD

The present invention relates to a vehicle braking/driving force control apparatus, and more particularly to a vehicle braking/driving force control apparatus that controls braking/driving force of each wheel.

BACKGROUND ART

As one of braking/driving force control apparatuses for a vehicle, such as an automobile, there has conventionally been known a driving force control apparatus, as disclosed in Japanese Unexamined Patent Application No. HEI9-309357 for example, for performing a distribution control of driving force applied to right and left wheels so as to exert a required yaw moment to a vehicle. Further, there has already been known a braking force control apparatus that controls a vehicle braking/driving force and yaw moment by controlling braking forces of wheels so as to secure a vehicle running stability. This braking/driving force control apparatus can enhance running stability of a vehicle.

In general, the vehicle braking/driving force and yaw moment can be controlled through the control of the braking/driving forces of the wheels. However, there is a limitation in the braking/driving force that can be generated by each wheel. Therefore, there may be the case in which the braking/driving force or yaw moment required to the vehicle exceeds the value attainable by the control of the braking/driving forces of the wheels. This situation is not considered in the above-mentioned conventional braking/driving force control apparatus, and it is necessary to make an improvement on this point.

When the target braking/driving force and/or the target yaw moment required to the vehicle exceed the values attainable by the control of the braking/driving forces of the wheels, the target braking/driving force and/or the target yaw moment may be modified such that the target braking/driving force and the target yaw moment after the modification take the values that are attainable by the braking/driving forces of the wheels and has as greater magnitude as possible. In that case, if the target braking/driving force sharply changes, the target yaw moment after the modification sharply increases or decreases, and if the target yaw moment sharply changes, the target braking/driving force after the modification sharply changes, resulting in that the vehicle running stability deteriorates and an occupant or occupants of the vehicle feel a sense of incongruity.

DISCLOSURE OF THE INVENTION

The present invention had been accomplished in view of the circumstance described above in the conventional vehicle braking/driving force control apparatus that is configured to control braking/driving force and yaw moment of the vehicle through the control of the braking/driving forces of the wheels, and the main subject of the present invention is to achieve a braking/driving force and yaw moment required to the vehicle as much as possible even when the braking/driving force and/or the yaw moment required to the vehicle exceeds the values attainable by the control of the braking/driving forces of the wheels, and to prevent sharp changes in the vehicle braking/driving force and in the yaw moment even if the target braking/driving force and/or the target yaw moment required to the vehicle sharply change.

The above-mentioned main subject can be achieved by a vehicle braking/driving force control apparatus comprising braking/driving force applying device that applies braking/driving forces to wheels; means for detecting an amount of driving operation by an occupant; means for calculating a vehicle target braking/driving force and a vehicle target yaw moment, to be generated by the braking/driving forces of the wheels, on the basis of at least the amount of the driving operation by the occupant; modifying means for modifying the target braking/driving force and/or the target yaw moment such that the target braking/driving force after the modification and the target yaw moment after the modification become values attainable by the braking/driving forces of the wheels, when the target braking/driving force and the target yaw moment cannot be achieved by the braking/driving forces of the wheels; and control means for controlling the braking/driving force applied to each wheel by the braking/driving force applying device such that the vehicle braking/driving force and the yaw moment by the braking/driving forces of the wheels become the target braking/driving force after the modification and the target yaw moment after the modification, wherein the modifying means suppresses change in the target yaw moment after the modification based on a rate of change in the target braking/driving force under the condition where the target braking/driving force and/or the target yaw moment cannot be achieved by the braking/driving forces of the wheels.

According to the above-mentioned configuration, even when the target braking/driving force and/or the target yaw moment cannot be achieved by the braking/driving forces of the wheels, the braking/driving force and the yaw moment close to the target braking/driving force and the target yaw moment can be achieved. Further, even when the target braking/driving force sharply changes, the sharp change in the vehicle yaw moment can be prevented, whereby the fear of deteriorating the vehicle running stability or providing a sense of incongruity to an occupant or occupants of the vehicle can effectively be reduced.

In the above-mentioned configuration, when the rate of change of the target braking/driving force is great, the degree of the suppression in the change of the target yaw moment after the modification may be greater than the case where the rate of change of the target braking/driving force is small.

In the above-mentioned configuration, the degree of the suppression in the change of the target yaw moment after the modification may be greater as the rate of change of the target braking/driving force is great.

These configurations can prevent that the change in the target yaw moment after the modification is excessively suppressed when the rate of change of the target braking/driving force is small, and can effectively prevent that the target yaw moment after the modification sharply changes when the rate of change of the target braking/driving force is great.

In the above-mentioned configuration, the modifying means may suppress the change of the target yaw moment after the modification by limiting the magnitude of the target yaw moment after the modification.

This configuration surely prevents that the magnitude of the target yaw moment after the modification excessively increases when the rate of change of the target braking/driving force is great, thereby being capable of surely preventing that the magnitude of the target yaw moment after the modification excessively increases and then decreases.

In the above-mentioned configuration, the modifying means may suppress the change of the target yaw moment after the modification by limiting the rate of change of the target yaw moment after the modification.

This configuration can surely prevent that the magnitude of the target yaw moment after the modification greatly changes even when the rate of change of the target braking/driving force is great.

In the above-mentioned configuration, the modifying means may suppress the change in the target yaw moment after the modification when the rate of change of the target braking/driving force is not less than a suppression reference value.

According to this configuration, it can surely be prevented that, under the condition where the rate of change of the target braking/driving force is small and therefore there is no fear of the great change in the target yaw moment after the modification even when the target braking/driving force changes, the change in the target yaw moment after the modification is unnecessarily suppressed.

In the above-mentioned configuration, the modifying means may suppress the change in the target yaw moment after the modification by limiting the magnitude of the target yaw moment after the modification to a limit value, wherein the limit value may be smaller when the magnitude of the rate of change of the target braking/driving force is great, compared to the case where the magnitude of the rate of change of the target braking/driving force is small.

In the above-mentioned configuration, the modifying means may suppress the change in the target yaw moment after the modification by limiting the magnitude of the rate of change of the target yaw moment after the modification to a limited rate of change, wherein the limited rate of change may be smaller when the magnitude of the rate of change of the target braking/driving force is great, compared to the case where the magnitude of the rate of change of the target braking/driving force is small.

The present invention also provides a vehicle braking/driving force control apparatus comprising braking/driving force applying means that can apply braking/driving forces to wheels; means for detecting an amount of driving operation by an occupant; means for calculating a vehicle target braking/driving force and a vehicle target yaw moment, which should be generated by the braking/driving forces of the wheels, on the basis of at least the amount of the driving operation by the occupant; modifying means for modifying the target braking/driving force and/or the target yaw moment such that the target braking/driving force and the target yaw moment after the modification become the values attainable by the braking/driving forces of the wheels, when the target braking/driving force and the target yaw moment cannot be achieved by the braking/driving forces of the wheels; and control means for controlling the braking/driving force applied to each wheel by the braking/driving force applying means such that the vehicle braking/driving force and the yaw moment by the braking/driving force of the wheels become the target braking/driving force after the modification and the target yaw moment after the modification, wherein the modifying means suppresses the change in the target braking/driving force after the modification involved with at least the change in the target yaw moment under the condition where the target braking/driving force and/or the target yaw moment cannot be achieved by the braking/driving forces of the wheels.

According to the above-mentioned configuration, even when the target braking/driving force and/or the target yaw moment cannot be achieved by the braking/driving forces of the wheels, the braking/driving force and the yaw moment close to the target braking/driving force and the target yaw moment, respectively can be achieved. Further, even when the target yaw moment sharply changes, the sharp change in the vehicle braking/driving force can be prevented, whereby the fear of deteriorating the vehicle running stability or providing a sense of incongruity to an occupant or occupants of the vehicle can effectively be reduced.

In the above-mentioned configuration, when the rate of change of the target yaw moment is great, the degree of the suppression in the change of the target braking/driving force after the modification may be greater than the case where the rate of change in the target yaw moment is small.

In the above-mentioned configuration, the degree of the suppression in the change of the target braking/driving force after the modification may be greater as the rate of change of the target yaw moment is great.

These configurations can prevent that the change in the target braking/driving force after the modification is excessively suppressed when the rate of change of the target yaw moment is small, and can effectively prevent that the target braking/driving force after the modification sharply changes when the rate of change of the target yaw moment is great.

In the above-mentioned configuration, the modifying means may suppress the change of the target braking/driving force after the modification by limiting the magnitude of the target braking/driving force after the modification.

This configuration surely prevents that the magnitude of the target braking/driving force after the modification excessively increases when the rate of change of the target yaw moment is great, thereby being capable of surely preventing that the magnitude of the target braking/driving force after the modification excessively increases and then decreases.

In the above-mentioned configuration, the modifying means may suppress the change of the target braking/driving force after the modification by limiting the rate of change of the target braking/driving force after the modification.

This configuration can surely prevent that the magnitude of the target braking/driving force after the modification greatly changes even when the rate of change of the target yaw moment is great.

In the above-mentioned configuration, the modifying means may suppress the change in the target braking/driving force after the modification when the rate of change of the target yaw moment is not less than a suppression reference value.

According to this configuration, it can surely be prevented that, under the condition where the rate of change of the target yaw moment is small and therefore there is no fear of the great change in the target braking/driving force after the modification even when the target yaw moment changes, the change in the target braking/driving force after the modification is unnecessarily suppressed.

In the above-mentioned configuration, the modifying means may suppress the change in the target braking/driving force after the modification by limiting the magnitude of the target braking/driving force after the modification to a limit value, wherein the limit value may be smaller when the magnitude of the rate of change of the target yaw moment is great, compared to the case where the magnitude of the rate of change of the target yaw moment is small.

In the above-mentioned configuration, the modifying means may suppress the change in the target braking/driving force after the modification by limiting the magnitude of the rate of change of the target braking/driving force after the modification to a limited rate of change, wherein the limited rate of change may be smaller when the magnitude of the rate of change of the target yaw moment is great, compared to the case where the magnitude of the rate of change of the target yaw moment is small.

In the aforesaid configuration, with a point of intersection of a straight line, which links a point that shows the target braking/driving force and the target yaw moment and the origin, and a line indicating the greatest values of the vehicle braking/driving force and the yaw moment by the braking/driving forces of the wheels being defined as a target point in a rectangular coordinate with the vehicle driving/braking force and the vehicle yaw moment as coordinate axis, the modifying means may set the target braking/driving force and the target yaw moment to the value at the target point.

With this configuration, the ratio of the vehicle braking/driving force and the yaw moment surely coincides with the ratio of the target braking/driving force and the target yaw moment and the vehicle braking/driving force and yaw moment by the braking/driving forces of the wheels take the greatest values, with the result that the vehicle braking/driving force and the yaw moment required to the vehicle can be achieved as much as possible within the ranges of the braking/driving force that can be generated by the wheels.

In the above-mentioned configuration, the means for calculating a vehicle target braking/driving force and a vehicle target yaw moment may calculate the vehicle target braking/driving force and the vehicle target total yaw moment for causing the vehicle to stably run on the basis of at least the amount of the driving operation by an occupant, estimate a vehicle turning yaw moment due to a lateral force of each wheel on the basis of at least the amount of the driving operation by the occupant, and calculate the vehicle target yaw moment by subtracting the turning yaw moment from the target total yaw moment.

With this configuration, the vehicle target braking/driving force and the vehicle target yaw moment that should be generated by the braking/driving forces of the wheels can be surely and correctly calculated in just proportion on the basis of at least the amount of the driving operation by an occupant.

In the above-mentioned configurations, the braking/driving force applying means may independently apply braking/driving force to each wheel.

In the above-mentioned configurations, the braking/driving force applying means may apply independently a braking force to each wheel, and apply a driving force from driving means, which is common to right and left wheels, to the right and left wheels in such a manner that the distribution of the driving forces to the right and left wheels is variable.

In the above-mentioned configurations, the means for detecting an amount of driving operation by an occupant may detect an amount of acceleration or deceleration operation or an amount of steering operation by an occupant.

In the above-mentioned configurations, the line indicating the greatest values of the vehicle braking/driving force and the vehicle yaw moment may be determined by the greatest value of the vehicle driving force, the greatest value of the vehicle braking force, the greatest value of the vehicle yaw moment in the leftward turning direction and the greatest value of the vehicle yaw moment in the rightward turning direction.

In the above-mentioned configurations, the line indicating the greatest values of the vehicle braking/driving force and the vehicle yaw moment may be variably set in accordance with a road friction coefficient.

In the above-mentioned configurations, the braking/driving force applying means may comprise means for applying driving force to each wheel independently, and means for applying braking force to each wheel independently.

In the above-mentioned configurations, the braking/driving force applying means may comprise means for applying common driving force to the right and left wheels, means for controlling the distribution of the driving force to the right and left wheels, and means for applying braking force to each wheel independently.

In the above-mentioned configurations, the means for applying driving force may comprise means for applying common driving force to the right and left front wheels, and means for applying common driving force to the right and left rear wheels.

In the above-mentioned configurations, the means for applying driving force may comprise means for applying common driving force to the right and left front wheels and the right and left rear wheels, means for controlling the distribution of the driving force to the front and rear wheels, means for controlling the distribution of the driving force to the right and left front wheels, and means for controlling the distribution of the driving force to the right and left rear wheels.

In the above-mentioned configurations, the means for applying driving force may comprise an electric motor generator.

In the above-mentioned configurations, the electric motor generator may perform regenerative braking upon the braking.

In the above-mentioned configurations, the means for calculating the vehicle target braking/driving force and the vehicle target yaw moment may calculate a vehicle target longitudinal acceleration and a vehicle target yaw rate for stably running the vehicle on the basis of at least the amount of the driving operation by an occupant, and calculate the vehicle target driving/braking force and the vehicle target total yaw moment on the basis of the vehicle target longitudinal acceleration and the vehicle target yaw rate.

In the above-mentioned configurations, the control means may calculate the target braking/driving force of each wheel on the basis of the vehicle target braking/driving force, the vehicle target yaw moment, and the distribution ratio of the braking/driving force to the front and rear wheels, and control the braking/driving force applied to each wheel on the basis of the target braking/driving force of each wheel.

BEST MODE FOR CARRYING OUT THE INVENTION

Some preferred embodiments of the present invention will be explained in detail with reference to the accompanying drawings.

First Embodiment

Figure 1:
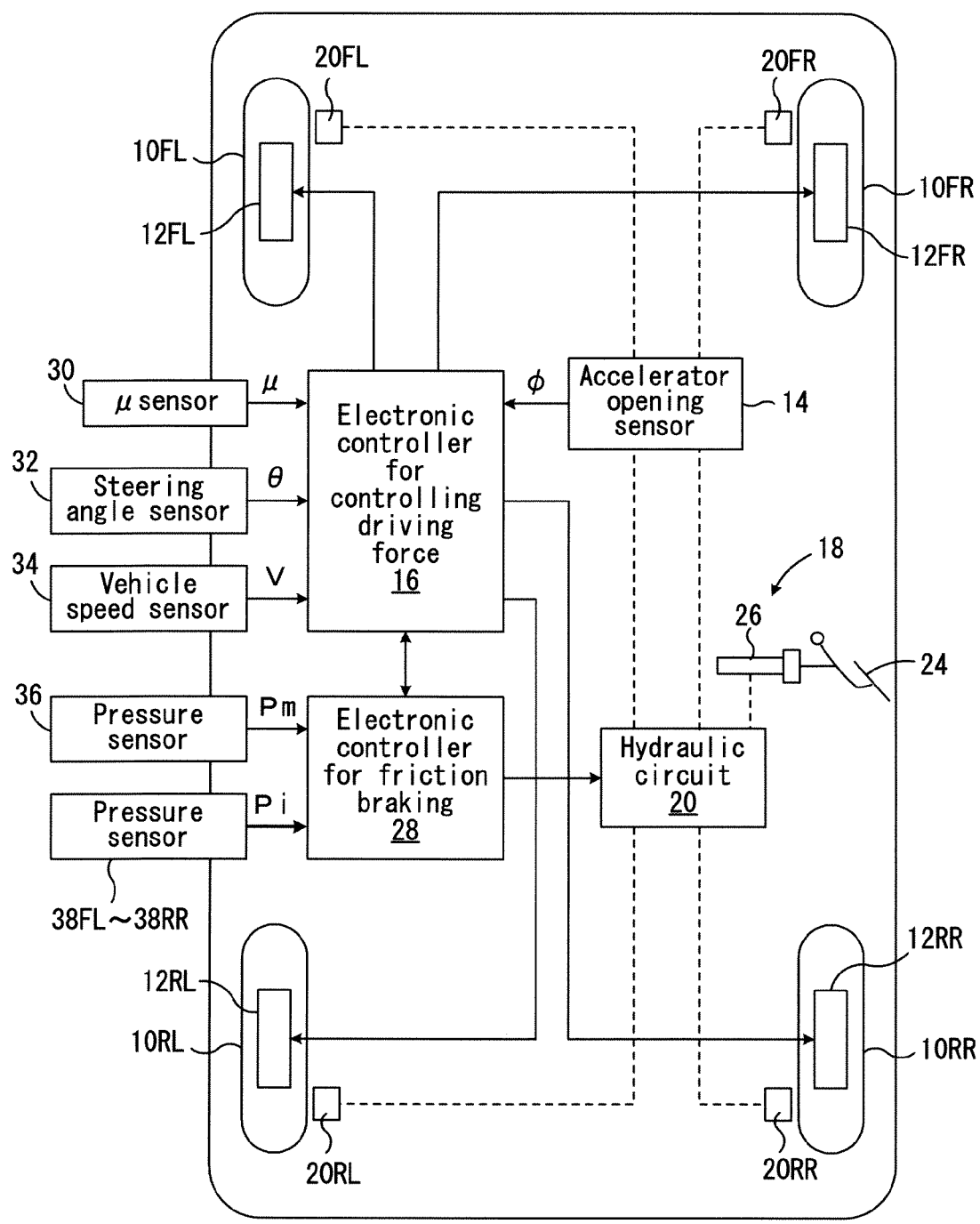
FIG. 1 is a schematic block diagram showing a braking/driving force control apparatus applied to a four-wheel-drive vehicle of a wheel-in-motor type according to a first embodiment of the present invention.

FIG. 1 is a schematic block diagram showing a braking/driving force control apparatus applied to a four-wheel-drive vehicle of a wheel-in-motor type according to a first embodiment of the present invention.

In FIG. 1, numerals 10FL and 10FR respectively represent left and right front wheels that are steering wheels, and numerals 10RL and 10RR respectively represent left and right rear wheels that are non-steering wheels. Electric motor generators 12FL and 12FR that are in-wheel motors are incorporated into the left and right front wheels 10FL and 10FR respectively, whereby the left and right front wheels 10FL and 10FR are driven by the electric motor generators 12FL and 12FR. The electric motor generators 12FL and 12FR also function as regenerative electric generators for each of the left and right front wheels upon the braking, so that they generate regenerative braking force.

Similarly, electric motor generators 12RL and 12RR that are in-wheel motors are incorporated into the left and right rear wheels 10RL and 10RR respectively, whereby the left and right front wheels 10RL and 10RR are driven by the electric motor generators 12RL and 12RR. The electric motor generators 12RL and 12RR also function as regenerative electric generators for each of the left and right rear wheels upon the braking, so that they generate regenerative braking force.

The driving force from each of the electric motor generators 12FL to 12RR is controlled by an electronic controller 16 for controlling driving force on the basis of an accelerator opening φ that is a step-on amount of an accelerator pedal, that is not shown in FIG. 1, detected by an accelerator opening sensor 14. The regenerative braking force from each of the electric motor generators 12FL to 12RR is also controlled by the electronic controller 16 for controlling driving force.

Although not shown in FIG. 1 in detail, the electronic controller 16 for controlling driving force is composed of a microcomputer and a driving circuit, wherein the microcomputer may have a general configuration to include, for example, a CPU, ROM, RAM, and input/output port device, those of which are interconnected with one another via a bi-directional common bus. In a normal running, electric power charged in a battery, which is not shown in FIG. 1, is supplied to each of the electric motor generators 12FL to 12RR, and upon the deceleration and braking of the vehicle, the electric power generated by the regenerative braking by each of the electric motor generators 12FL to 12RR is charged to the battery via the driving circuit.

The friction braking forces of the left and right front wheels 10FL and 10FR and the left and right rear wheels 10RL and 10RR are controlled by controlling braking pressures of corresponding wheel cylinders 22FL, 22FR, 22RL and 22RR by a hydraulic circuit 20 in a friction braking device 18. Although not shown in the figure, the hydraulic circuit 20 includes a reservoir, oil pump, and other various valve devices. In a normal situation, the braking pressure of each wheel cylinder is controlled in accordance with the step-on amount of the brake pedal 24 by a driver and the pressure of a master cylinder 26 that is driven in accordance with the step-on operation of the brake pedal 24. It is controlled as necessary through the control of the oil pump or various valve devices by an electronic controller 28 for controlling braking force, regardless of the step-on amount of the brake pedal 24 by a driver.

Although not shown in FIG. 1 in detail, the electronic controller 18 for controlling braking force is also composed of a microcomputer and a driving circuit, wherein the microcomputer may have a general configuration to include, for example, a CPU, ROM, RAM, and input/output port device, those of which are interconnected with one another via a bi-directional common bus.

Inputted to the electronic controller 16 for controlling driving force are a signal indicating a road friction coefficient μ from a μ sensor 30; a signal indicating a steering angle θ from a steering angle sensor 32; and a signal indicating a vehicle speed V from a vehicle speed sensor 34, in addition to the signal indicating the accelerator opening φ from the accelerator opening sensor 14. Inputted to the electronic controller 28 for controlling braking force are a signal indicating a master cylinder pressure Pm from a pressure sensor 36 and signals indicating braking pressures (wheel cylinder pressures) Pbi (i=fl, fr, rl, rr) of corresponding wheels from pressure sensors 38FL to 38RR. The electronic controller 16 for controlling driving force and the electronic controller 28 for controlling braking force exchange signals with each other according to need. Note that the steering angle sensor 32 detects a steering angle θ with the leftward turning direction of the vehicle defined as a positive.

The electronic controller 16 for controlling driving force calculates a vehicle target longitudinal acceleration Gxt on the basis of the accelerator opening φ and the master cylinder pressure Pm, which indicate an amount of acceleration/deceleration operation by a driver, and calculates a target yaw rate γt of the vehicle on the basis of the steering angle θ, which is an amount of steering operation by a driver, and the vehicle speed V through a manner well-known in this technical field. Then, the electronic controller 16 for controlling driving force calculates a target braking/driving force Fvn that is required to the vehicle on the basis of the vehicle target longitudinal acceleration Gxt, and calculates a target total yaw moment Mvnt required to the vehicle on the basis of the vehicle target yaw rate γt.

The electronic controller 16 for controlling driving force calculates the vehicle slip angle β with a manner well-known in this technical field, calculates the slip angle α of the left and right front wheels on the basis of the vehicle slip angle β and the steering angle θ, and calculates a vehicle turning yaw moment Ms due to a lateral force of each wheel on the basis of the slip angle α. Then, the electronic controller 16 for controlling driving force calculates the value obtained by subtracting the turning yaw moment Ms from the vehicle target total yaw moment Mvnt as the vehicle target yaw moment Mvn, required to the vehicle, through the control of the braking/driving force of each wheel.

The electronic controller 16 for controlling driving force further calculates the vehicle maximum driving force Fvdmax and the vehicle maximum braking force Fvbmax attainable by the braking/driving forces of the wheels on the basis of the road friction coefficient μ, and calculates the vehicle maximum yaw moment Mvlmax in the leftward turning direction and the vehicle maximum yaw moment Mvrmax in the rightward turning direction attainable by the braking/driving forces of the wheels on the basis of the road friction coefficient μ.

Figure 2A:
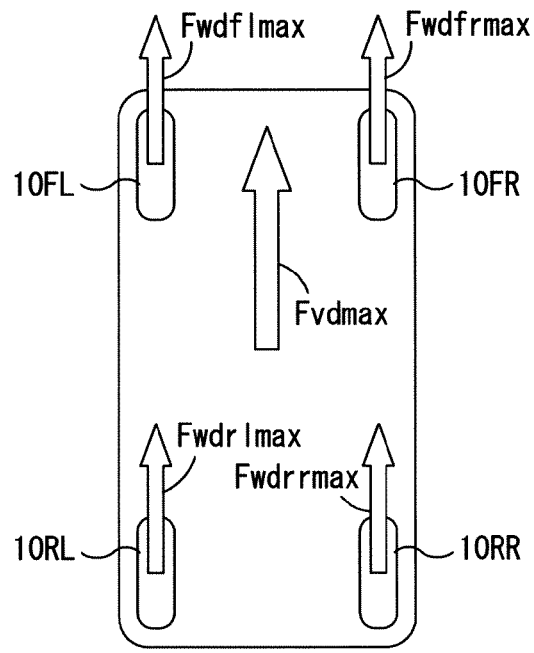
FIG. 2 is an explanatory view for explaining various cases of the relationship between braking/driving force of each wheel and a vehicle braking/driving force and the relationship between braking/driving force of each wheel and a vehicle yaw moment.
Figure 2B:
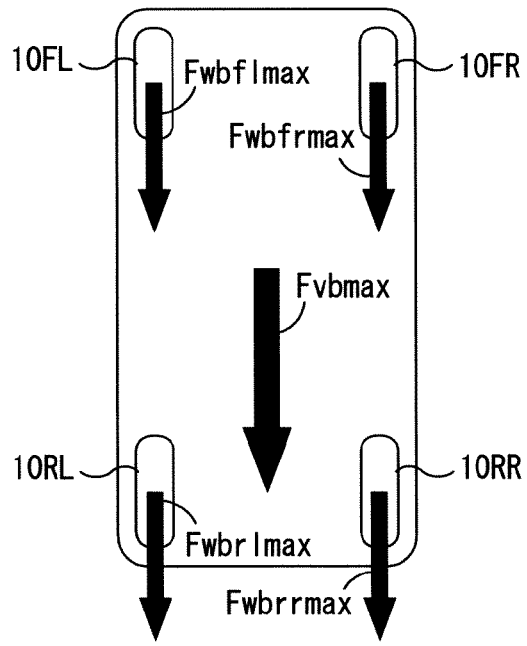

As shown in FIG. 2A, supposing that the vertical load and the friction coefficients to the road surface of the wheels are the same, and the sizes of the friction circles of the wheels are the same, the vehicle maximum driving force Fvdmax under the condition where the yaw moment by the braking/driving forces of the wheels is not acted on the vehicle is achieved when the braking/driving forces Fwxfl and Fwxfr of the left and right front wheels 10FL and 10FR are the maximum driving forces Fwdflmax and Fwdfrmax and the braking/driving forces Fwxrl and Fwxrr of the left and right rear wheels 10RL and 10RR are the maximum driving forces Fwdrlmax and Fwdrrmax. Similarly, as shown in FIG. 2B, the vehicle maximum braking force Fvbmax under the condition where the yaw moment by the braking/driving forces of the wheels is not acted on the vehicle is achieved when the braking/driving forces Fwxfl and Fwxfr of the left and right front wheels 10FL and 10FR are the maximum braking forces Fwbflmax and Fwbfrmax and the braking/driving forces Fwxrl and Fwxrr of the left and right rear wheels 10RL and 10RR are the maximum braking forces Fwbrlmax and Fwbrrmax.

Figure 2C:
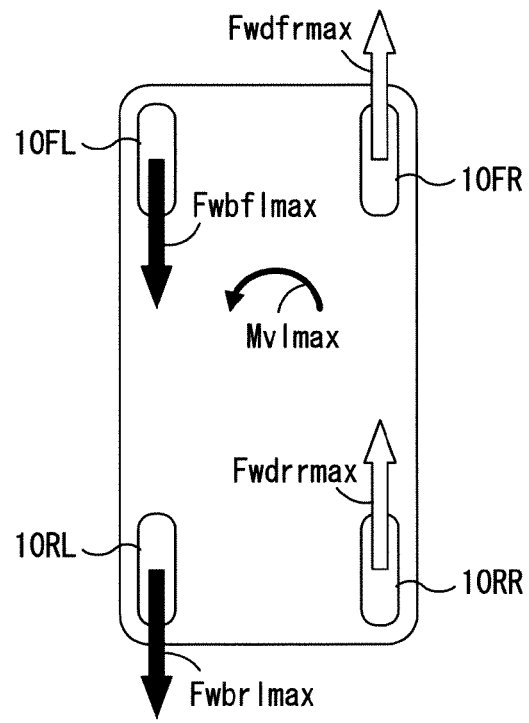
Figure 2D:
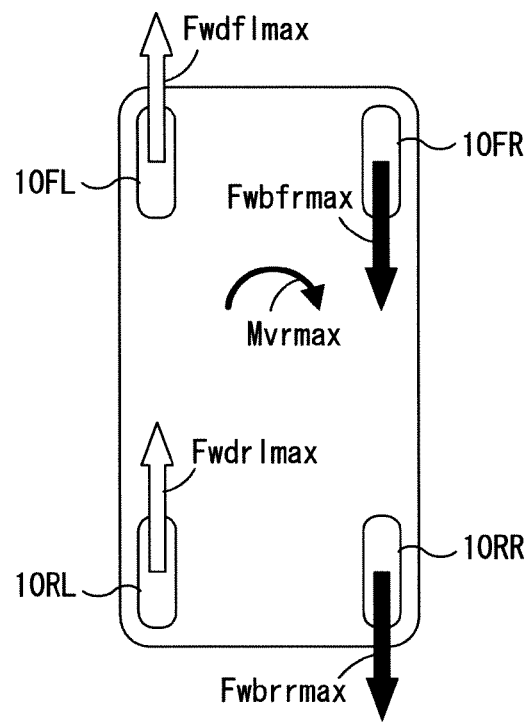

As shown in FIG. 2C, the vehicle maximum yaw moment Mvlmax in the leftward turning direction under the condition where the longitudinal force by the braking/driving forces of the wheels is not acted on the vehicle is achieved when the braking/driving forces Fwxfl and Fwxrl of the front left and rear left wheels 10FL and 10RL are the maximum braking forces Fwbflmax and Fwbrlmax and the braking/driving forces Fwxfr and Fwxrr of the front right and rear right wheels 10FR and 10RR are the maximum driving forces Fwdfrmax and Fwdrrmax. Similarly, as shown in FIG. 2D, the vehicle maximum yaw moment Mvrmax in the rightward turning direction under the condition where the longitudinal force by the braking/driving forces of the wheels is not acted on the vehicle is achieved when the braking/driving forces Fwxfl and Fwxrl of the front left and rear left wheels 10FL and 10RL are the maximum driving forces Fwdflmax and Fwdrlmax and the braking/driving forces Fwxfr and Fwxrr of the front right and rear right wheels 10FR and 10RR are the maximum braking forces Fwbfrmax and Fwbrrmax.

In case where the output torque of each of the electric motor generators 12FL to 12RR is sufficiently great, the maximum driving force and the maximum braking force of each wheel are determined by the road friction coefficient μ, so that, with the vehicle accelerating direction and vehicle leftward turning direction defined as positive, the following relationships are established between the maximum driving force and the maximum braking force of each wheel, the vehicle maximum driving force and the vehicle maximum braking force, and the vehicle maximum yaw moment in the leftward turning direction and the vehicle maximum yaw moment in the rightward turning direction.

$Fwdfl\text{max}=Fwdfr\text{max}=-Fwbfl\text{max}=-Fwbfr\text{max}$ $Fwdrl\text{max}=Fwdrr\text{max}=-Fwbrl\text{max}=-Fwbrr\text{max}$ $Fvd\text{max}=-Fvb\text{max}$ $Mvl\text{max}=-Mvr\text{max}$ Since the maximum driving force Fwdimax and the maximum braking force Fwbimax (i=fl, fr, rl, rr) of each wheel are determined by the road friction coefficient μ, the vehicle maximum driving force Fvdmax, vehicle maximum braking force Fvbmax, vehicle maximum yaw moment Mvlmax in the leftward turning direction, and vehicle maximum yaw moment Mvrmax in the rightward turning direction are also determined by the road friction coefficient μ. Accordingly, if the road friction coefficient μ is found, the vehicle maximum driving force Fvdmax and the other aforesaid values can be estimated.

Figure 5A:
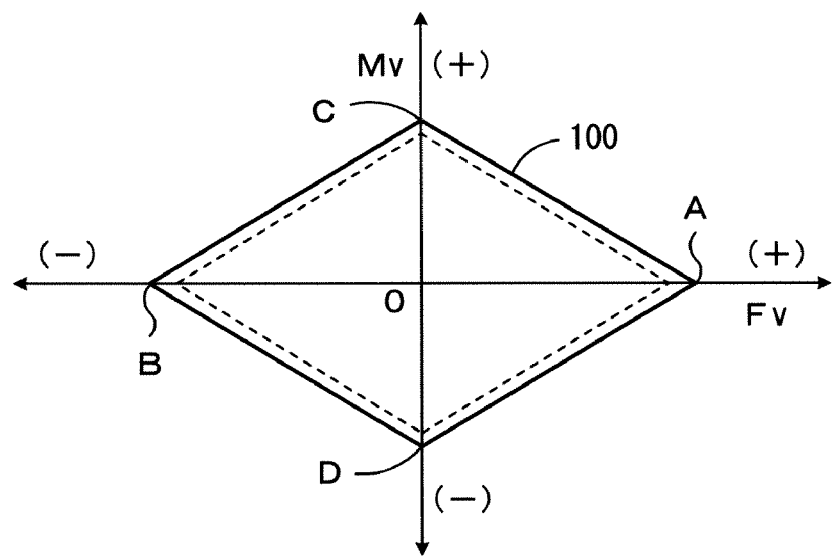
FIG. 5A is a graph showing the range, that can be achieved by the braking/driving forces of the wheels, of the vehicle braking/driving force and vehicle yaw moment in the first embodiment.

As shown in FIG. 5A, in a rectangular coordinate with the vehicle braking/driving force Fvx as abscissa and the vehicle yaw moment Mv as ordinate, the vehicle braking/driving force Fvx and the vehicle yaw moment Mv that can be achieved by the control of the braking/driving force of each wheel take values within a diamond quadrangle 100 decided by the vehicle maximum driving force Fvdmax, vehicle maximum braking force Fvbmax, vehicle maximum yaw moment Mvlmax in the leftward turning direction, and vehicle maximum yaw moment Mvrmax in the rightward turning direction.

Figure 5B:
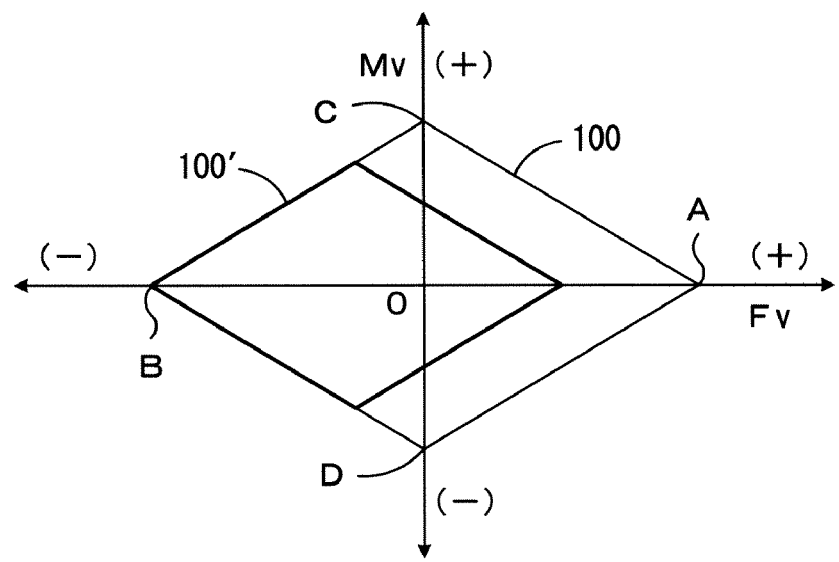
FIG. 5B is an explanatory view showing the range, that can be achieved by the control of the braking/driving forces of the wheels, of a vehicle target braking/driving force Fvn and a vehicle target yaw moment Mvn in the vehicle having a driving source provided only at the right and left front wheels or at the right and left rear wheels in the first embodiment.

Notably, in FIG. 5, points A to D correspond to the cases A to D in FIG. 2, wherein the coordinates at the points A to D are (Fvdmax, 0), (Fvbmax, 0), (0, Mvlmax), and (0, Mvrmax), respectively. As shown by a broken line in FIG. 5A, the quadrangle 100 becomes small as the road friction coefficient μ decreases. Further, as the steering angle θ increases, the lateral force of front left and front right wheels, that are steering wheels, increases, so that the allowance of the longitudinal force becomes small. Therefore, the quadrangle 100 becomes small as the magnitude of the steering angle θ increases.

Supposing that the longitudinal distribution ratio of the vehicle braking/driving force Fv to the rear wheels is defined as Kr (constant of 0<Kr<1), and the vehicle tread is defined as Tr, the following equations 1 to 3 are established. Accordingly, the electronic controller 16 for controlling driving force sets the vehicle target braking/driving force Fvt and the vehicle target yaw moment Mvt by the control of the braking/driving forces of each wheel to the target braking/driving force Fvn and the vehicle target yaw moment Mvn, when the vehicle target braking/driving force Fvn and the vehicle target yaw moment Mvn are within the above-mentioned quadrangle 100. For example, it calculates the values satisfying the following equations 1 to 3 as the target braking/driving forces Fwxti (i=fl, fr, rl, rr) of the wheels by the least square method.

$$Fwxfl+Fwxfr+Fwxrl+Fwxrr=Fvt \quad (1)$$

$$\{Fwxfr+Fwxrr-(Fwxfl+Fwxrl)\}Tr/2=Mvt \quad (2)$$

$$(Fwxfl+Fwxfr)Kr=(Fwxrl+Fwxrr)(1-Kr) \quad (3)$$

When the vehicle target braking/driving force Fvn and the vehicle target yaw moment Mvn are outside the range of the above-mentioned quadrangle 100, the electronic controller 16 for controlling driving force calculates the vehicle target braking/driving force Fvt and the vehicle target yaw moment Mvt such that the magnitude of the vehicle braking/driving force Fv and the magnitude of the yaw moment Mv by the target braking/driving forces Fwxti of the wheels become respectively the maximum within the range where the ratio of the vehicle target braking/driving force Fvt and the yaw moment Mvt by the braking/driving forces of the wheels becomes the ratio of the target braking/driving force Fvn and the target yaw moment Mvn, required to the vehicle, by the braking/driving forces of the wheels. Then, the electronic controller 16 for controlling driving force calculates the values satisfying the foregoing equations 1 to 3 as the target braking/driving forces Fwxti of the wheels by the least square method, for example.

In particular, the electronic controller 16 for controlling driving force calculates a limit value Mlim of the vehicle target yaw moment Mvt on the basis of the magnitude of the rate of change of the target braking/driving force Fvn in such a manner that, as the magnitude of the rate of change of the target braking/driving force Fvn is great, the limit value Mlim of the vehicle target yaw moment Mvt becomes small, and calculates a limit value Flim of the vehicle target braking/driving force Fvt on the basis of the magnitude of the rate of change of the target yaw moment Mvn in such a manner that, as the magnitude of the rate of change of the target yaw moment Mvn is great, the limit value Flim of the vehicle target braking/driving force Fvt becomes small.

When the magnitude of the vehicle target yaw moment Mvt after the modification exceeds the limit value Mlim, the electronic controller 16 for controlling driving force corrects the magnitude of the target yaw moment Mvt to the limit value Mlim. When the magnitude of the vehicle target braking/driving force Fvt after the modification exceeds the limit value Flim, the electronic controller 16 for controlling driving force corrects the magnitude of the target braking/driving force Fvt to the limit value Flim. Accordingly, this configuration prevents a sharp change in the increase or decrease of the vehicle target braking/driving force Fvt or the vehicle target yaw moment Mvt involved with the sharp change in the target braking/driving force Fvn or the target yaw moment Mvn.

When the target braking/driving force Fwxti of each wheel takes a positive value that means it is a driving force, the electronic controller 16 for controlling driving force sets the target friction braking force Fwbti and the target regenerative braking force Fwrti (i=fl, fr, rl, rr) of each wheel to zero, outputs the signals indicating the target friction braking forces Fwbti to the electronic controller 28 for controlling braking force, sets the target driving force Fwdti (i=fl, fr, rl, rr) of each wheel to the associated target braking/driving force Fwxti, calculates the target driving currents Iti (i=fl, fr, rl, rr) to the electric motor generators 12FL to 12RR by unillustrated maps or functions on the basis of the target driving forces Fwdti, and controls the driving currents applied to the electric motor generators 12FL to 12RR on the basis of the target driving currents Iti, thereby controlling the driving force of each wheel such that the braking/driving force Fwxi of each wheel becomes the associated target braking/driving force Fwxti.

On the other hand, when the target braking/driving forces Fwxti of each wheel takes a negative value which means that the target braking/driving force Fwxti is a braking force and the target braking/driving force Fwxti is not more than the maximum regenerative braking force of each wheel, the electronic controller 16 for controlling driving force sets the target driving force Fwdti and the target friction braking force Fwbti of each wheel to zero, sets the target regenerative braking force Fwrti to the target braking/driving force Fwxti, and controls the electric motor generators 12FL to 12RR such that the regenerative braking force becomes the target regenerative braking force Fwrti.

When the target braking/driving force Fwxti of each wheel takes a negative value which means that the target braking/driving force Fwxti is a braking force and the target braking/driving force Fwxti is greater than the maximum regenerative braking force of each wheel, the electronic controller 16 for controlling driving force sets the target driving force Fwdti of each wheel to zero, sets the target regenerative braking force Fwrti of each wheel to the maximum regenerative braking force Fwxrimax (i=fl, fr, rl, rr), and controls the electric motor generators 12FL to 12RR such that the regenerative braking force becomes the maximum regenerative braking force Fwxrimax. Further, it calculates the braking force that corresponds to the difference between the target braking/driving force Fwxti and the maximum regenerative braking force Fwxrimax as the target friction braking force Fwbti (i=fl, fr, rl, rr), and outputs the signals indicating the target friction braking forces Fwbti of the wheels to the electronic controller 28 for controlling braking force.

The electronic controller 28 for controlling braking force calculates the target braking pressure Pbti (i=fl, fr, rl, rr) of each wheel on the basis of the target friction braking force Fwbti of each wheel inputted from the electronic controller 16 for controlling driving force, and controls the hydraulic circuit 20 such that the braking pressure Pbi of each wheel becomes the associated target braking pressure Pbti, and the friction braking force Fwbi (i=fl, fr, rl, rr) of each wheel thereby becomes the associated target friction braking force Fwbti of each wheel.

Figure 3:
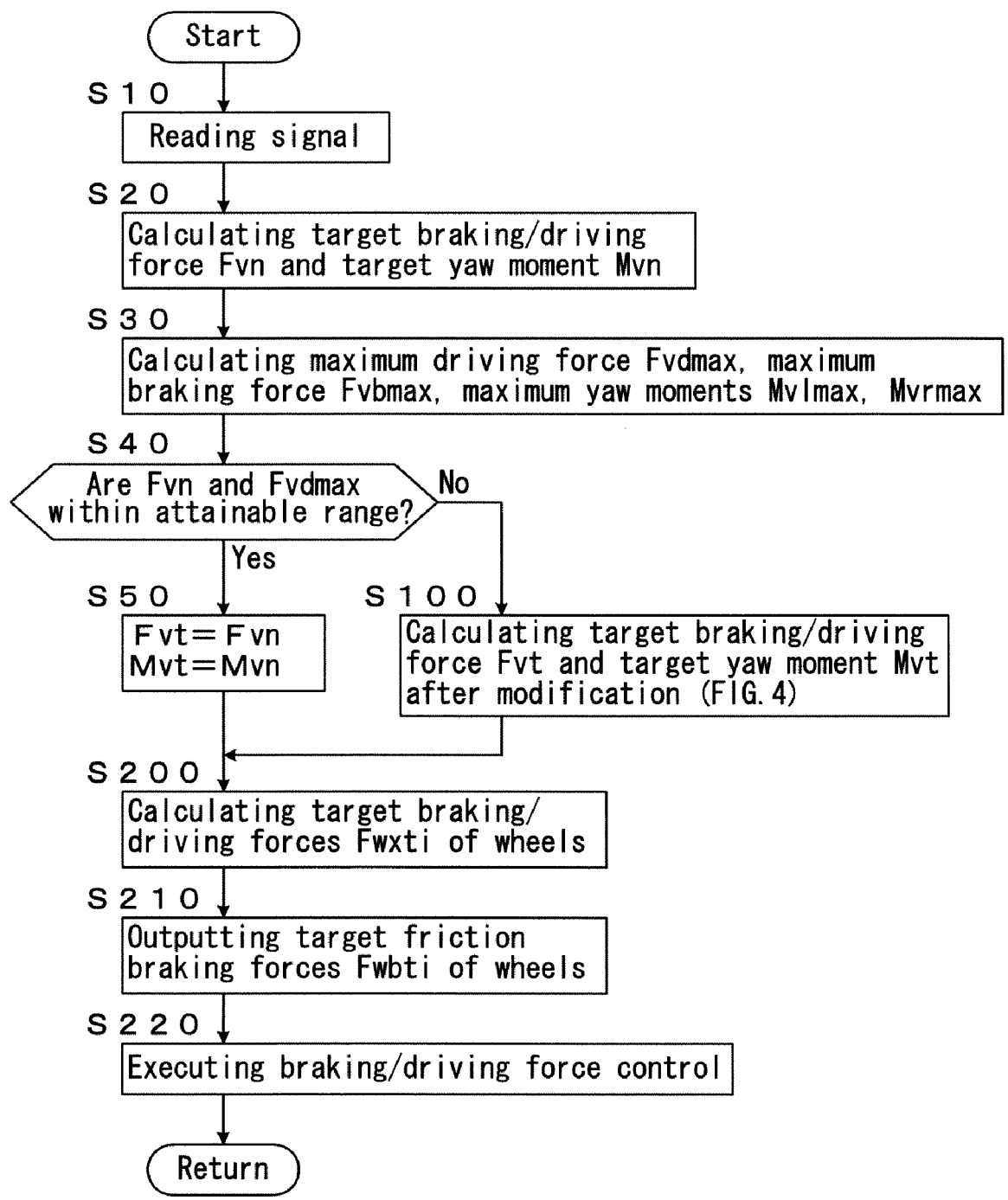
FIG. 3 is a flowchart showing a braking/driving force control routine executed by an electronic controller for controlling driving force in the first embodiment.

The braking/driving force control achieved by the electronic controller 16 for controlling driving force in the first embodiment will now be explained with reference to the flowchart shown in FIG. 3. The control by the flowchart shown in FIG. 3 is started by the activation of the electronic controller 16 for controlling driving force, and it is repeatedly executed every predetermined time until an ignition switch, not shown, is turned off.

At Step 10, the signals indicating the accelerator opening $\phi$ detected by the accelerator opening sensor 14 and the like are firstly read. At Step 20, the vehicle target braking/driving force Fvn and vehicle target yaw moment Mvn that are required to the vehicle and caused by the control of the braking/driving force of each wheel are calculated in the aforesaid manner on the basis of the accelerator opening $\phi$ and the like.

At Step 30, the vehicle maximum driving force Fvdmax, vehicle maximum braking force Fvbmax, vehicle maximum yaw moment Mvlmax in the leftward turning direction, and vehicle maximum yaw moment Mvrmax in the rightward direction, attainable by the braking/driving force of each wheel, are calculated by maps or functions, not shown, on the basis of the road friction coefficient $\mu$. Specifically, the points A to D shown in FIG. 5 are specified.

At Step 40, it is determined whether or not the vehicle target braking/driving force Fvn and the vehicle target yaw moment Mvn are within the range of the quadrangular 100 and the target braking/driving force Fvn, i.e. whether or not the target yaw moment Mvn can be achieved through the control of the braking/driving forces of the wheels. When the negative determination is made, the program proceeds to Step 100. When the positive determination is made, the vehicle target braking/driving force Fvt after the modification and the vehicle target yaw moment Mvt after the modification are respectively set to the target braking/driving force Fvn and the target yaw moment Mvn at Step 50, and then, the program proceeds to Step 200.

Figure 4:
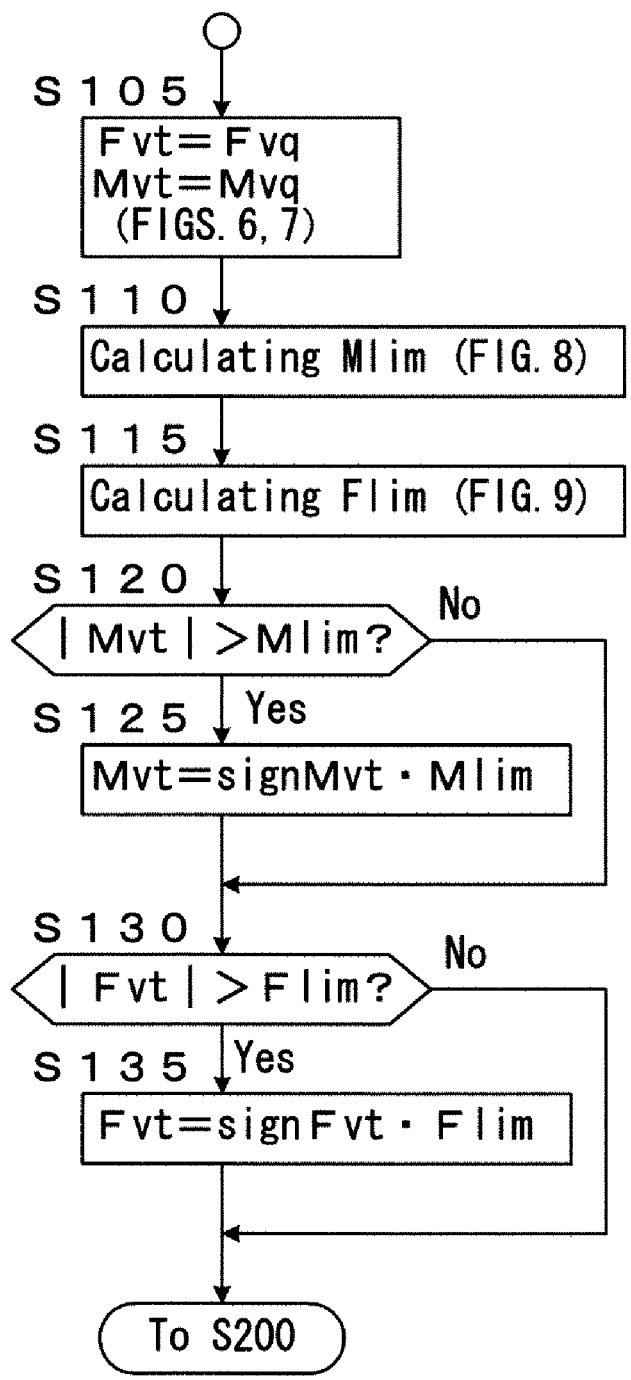
FIG. 4 is a flowchart showing a calculation routine of a target braking/driving force Fvt after the modification and a yaw moment Mvt after the modification at Step 100 in the flowchart shown in FIG. 3.

At Step 100, the vehicle target braking/driving force Fvt after the modification and the vehicle yaw moment Mvt after the modification are calculated on the basis of the target braking/driving force Fvn and the target yaw moment Mvn in accordance with the flowchart shown in FIG. 4. Thereafter, the program proceeds to Step 200.

At Step 200, the target braking/driving force Fwxti (i=fl, fr, rl, rr) of each wheel to achieve the target braking/driving force Fvt and the target yaw moment Mvt is calculated in the above-mentioned manner on the basis of the vehicle target braking/driving force Fvt after the modification and the vehicle target yaw moment Mvt after the modification.

At Step 210, the target friction braking force Fwbti is calculated in the aforesaid manner, and the signals indicating the target friction braking forces Fwbti are outputted to the electronic controller 28 for controlling braking force, whereby the electronic controller 28 for controlling braking force makes a control such that the friction braking force Fwbi of each wheel becomes the associated target friction braking force Fwbti.

At Step 220, each of the electric motor generators 12FL to 12RR is controlled such that the driving force Fwdi or the regenerative braking force Fwri of each wheel respectively becomes the target driving force Fwdti or the target regenerative braking force Fwrti.

Explained next with reference to the flowchart shown in FIG. 4 is a calculation routine of the target braking/driving force Fvt and the yaw moment Mvt after the modification at Step 100 described above, i.e., a calculation routine of the target braking/driving force Fvt and the yaw moment Mvt after the modification under the condition where the target braking/driving force Fvn and the target yaw moment Mvn cannot be achieved by the braking/driving forces of the wheels.

Figure 6A:
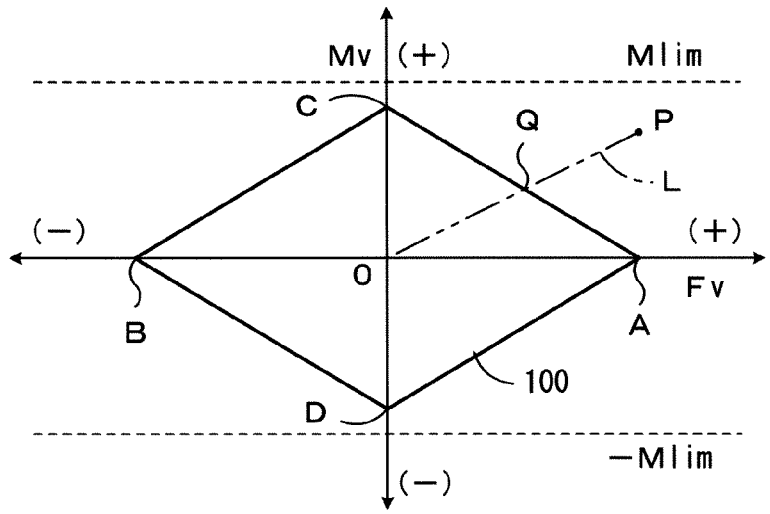
FIGS. 6A and 6B are explanatory views showing a manner of a calculation of the vehicle target braking/driving force Fvt after the modification and the vehicle target yaw moment Mvt after the modification in case where the vehicle target braking/driving force Fvn and the vehicle target yaw moment Mvn are outside the range that can be achieved by the control of the braking/driving forces of the wheels in the first embodiment.
Figure 7A:
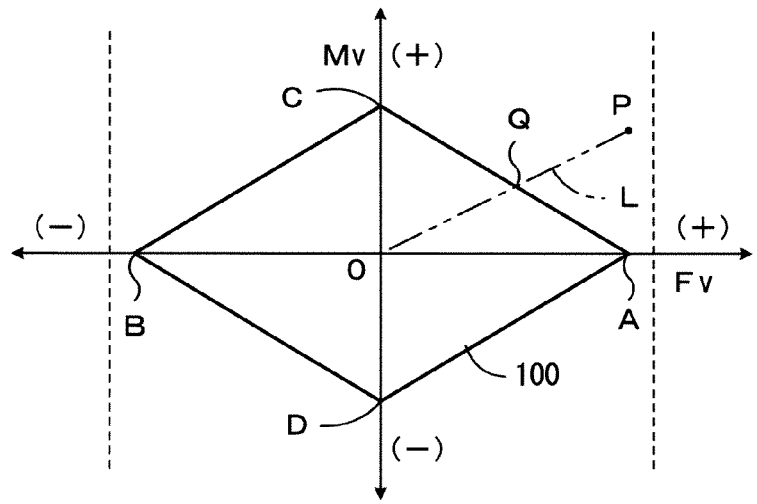
FIGS. 7A and 7B are explanatory views showing a manner of a calculation of the vehicle target braking/driving force Fvt after the modification and the vehicle target yaw moment Mvt after the modification in case where the vehicle target braking/driving force Fvn and the vehicle target yaw moment Mvn are outside the range that can be achieved by the control of the braking/driving forces of the wheels in the first embodiment.

At Step 105, a point of intersection Q of a segment L, which links a point P that shows the vehicle target braking/driving force Fvn and the vehicle target yaw moment Mvn, and the origin O and the outer line of the quadrangular 100 is obtained as the target point, as shown in FIG. 6A and FIG. 7A, and if the coordinate of the target point Q is defined as (Fvq, Mvq), the vehicle target braking/driving force Fvt after the modification and the vehicle target yaw moment Mvt after the modification are set to Fvq and Mvq, respectively. Thereafter, the program proceeds to Step 200.

Figure 8:
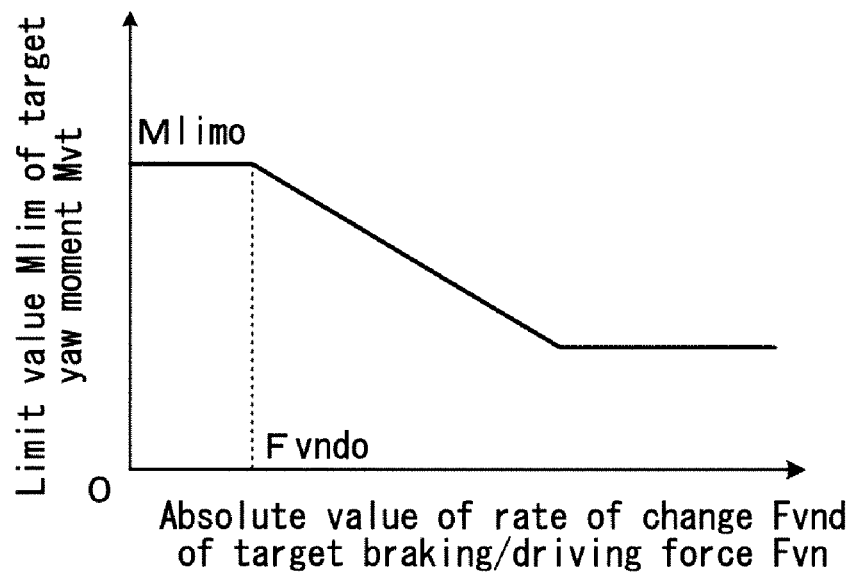
FIG. 8 is a graph showing a relationship between an absolute value of a rate of change Fvnd of the target braking/driving force Fvn and a limit value Mlim of the vehicle target yaw moment Mvt.

At Step 110, the rate of change Fvnd of the target braking/driving force Fvn is calculated as the time-differentiated value of the vehicle target braking/driving force Fvn, and the limit value Mlim of the vehicle target yaw moment Mvt is calculated from the map corresponding to the graph shown in FIG. 8 on the basis of the absolute value of the rate of change Fvnd of the target braking/driving force Fvn. It is to be noted that, in FIG. 8, the limit value Mlimo in the event that the absolute value of the rate of change Fvnd of the target braking/driving force Fvn is not more than a suppression reference value Fvndo is a constant value greater than the magnitudes of the greatest yaw moments Mvlmax and Mvrmax.

Figure 9:
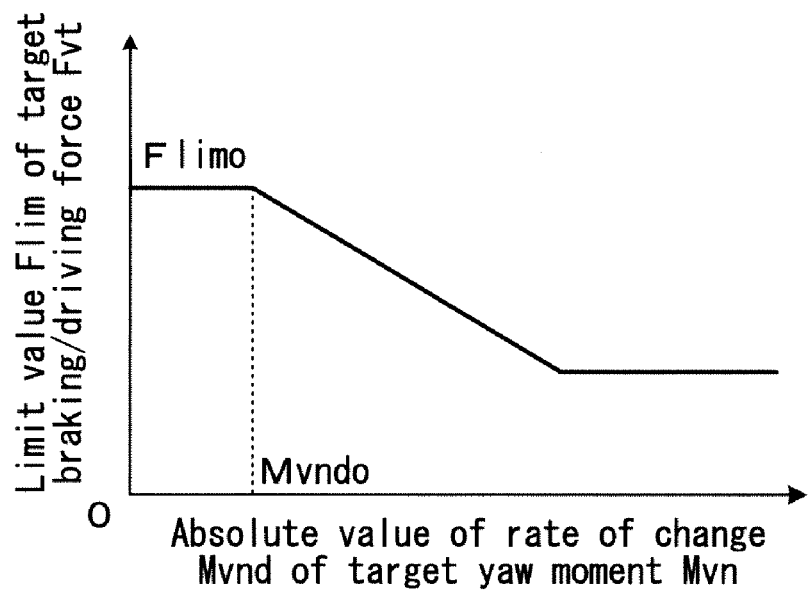
FIG. 9 is a graph showing a relationship between an absolute value of a rate of change Mvnd of the target yaw moment Mvn and a limit value Flim of the vehicle target braking/driving force Fvt.

At Step 115, the rate of change Mvnd of the target yaw moment Mvn is calculated as the time-differentiated value of the vehicle target yaw moment Mvn, and the limit value Flim of the vehicle target braking/driving force Fvt is calculated from the map corresponding to the graph shown in FIG. 9 on the basis of the absolute value of the rate of change Mvnd of the target yaw moment Mvn. It is to be noted that, in FIG. 9, the limit value Flimo in the event that the absolute value of the rate of change Mvnd of the target yaw moment Mvn is not more than a suppression reference value Mvndo is a constant value greater than the magnitudes of the greatest braking/driving forces Fvdmax and Fvbmax.

At Step 120, it is determined whether the absolute value of the vehicle target yaw moment Mvt after the modification exceeds the limit value Mlim or not. When a negative determination is made, the program proceeds to Step 130, and when a positive determination is made, the vehicle target yaw moment Mvt after the modification is corrected to signMvt·Mlim at Step 125 with signMvt defined as a sign for the vehicle target yaw moment Mvt. Thereafter, the program proceeds to Step 130.

Figure 6B:
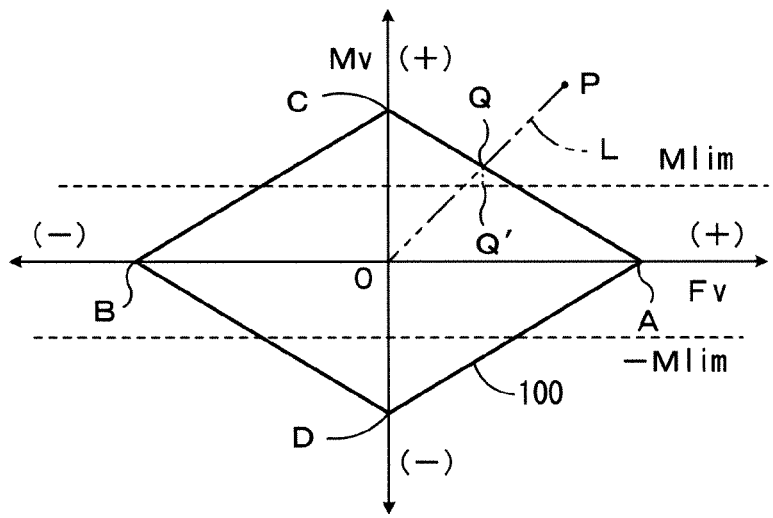

In the state shown in FIG. 6B, for example, the vehicle target braking/driving force Fvt after the modification is maintained to be the value Fvq at the coordinate of the target point Q, but the vehicle target yaw moment Mvt after the modification is corrected to Mlim. Therefore, the vehicle target braking/driving force Fvt after the modification and the target yaw moment Mvt after the modification are set to the value of the coordinate at the point of intersection Q' of the perpendicular dropped to the straight line of the limit value Mlim from the target point Q.

At Step 130, it is determined whether the absolute value of the vehicle target braking/driving force Fvt after the modification exceeds the limit value Flim or not. When a negative determination is made, the program proceeds to Step 200, and when a positive determination is made, the vehicle target braking/driving force Fvt after the modification is corrected to signFvt·Flim at Step 135 with signFvt defined as a sign for the vehicle target braking/driving force Fvt. Thereafter, the program proceeds to Step 200.

Figure 7B:
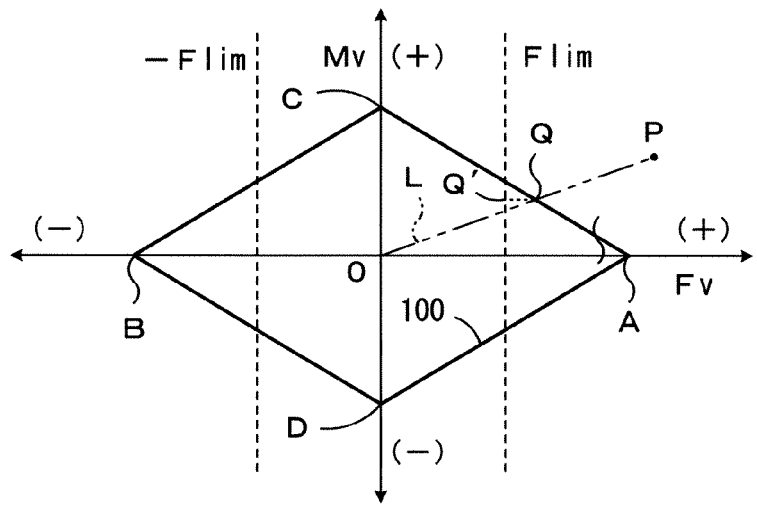

In the state shown in FIG. 7B, for example, the vehicle target yaw moment Mvt after the modification is maintained to be the value Mvq at the coordinate of the target point Q, but the vehicle target braking/driving force Fvt after the modification is corrected to Flim. Therefore, the vehicle target braking/driving force Fvt after the modification and the target yaw moment Mvt after the modification are set to the value of the coordinate at the point of intersection Q' of the perpendicular dropped to the straight line of the limit value Flim from the target point Q.

According to the illustrated first embodiment, the vehicle target braking/driving force Fvn and the vehicle target yaw moment Mvn, required to the vehicle, through the control of the braking/driving forces of the wheels are calculated at Step 20, the vehicle maximum driving force Fvdmax, vehicle maximum braking force Fvbmax, vehicle maximum yaw moment Mvlmax in the leftward turning direction, and the vehicle maximum yaw moment Mvrmax in the rightward turning direction, those of which are attainable by the braking/driving forces of the wheels, are calculated at Step 30, and it is determined at Step 40 whether or not the target braking/driving force Fvn and the target yaw moment Mvn can be achieved through the control of the braking/driving forces of the wheels.

When it is determined at Step 40 that the target braking/driving force Fvn and the target yaw moment Mvn cannot be achieved by the control of the braking/driving force of the wheels, Step 100, i.e., Steps 105 to 135 are executed, whereby the vehicle target braking/driving force Fvt after the modification and the vehicle target yaw moment Mvt after the modification are calculated as the values attainable by the braking/driving forces of the wheels.

At Step 105, the point of intersection Q of the segment L, which links the point P that shows the vehicle target braking/driving force Fvn and the vehicle target yaw moment Mvn and the origin O, and the outer line of the quadrangular 100 is obtained as the target point, and the vehicle target braking/driving force Fvt after the modification and the vehicle target yaw moment Mvt after the modification are set respectively to Fvq and Mvq that are the values at the point Q. At Step 110, the limit value Mlim of the vehicle target yaw moment Mvt is calculated on the basis of the absolute value of the rate of change Fvnd of the target braking/driving force Fvn. At Step 115, the limit value Flim of the vehicle target braking/driving force Fvt is calculated on the basis of the absolute value of the rate of change Mvnd of the vehicle target yaw moment Mvt. When the magnitudes of the vehicle target braking/driving force Fvt after the modification and the vehicle target yaw moment Mvt after the modification exceed the limit values Flim and Mlim, respectively, these magnitudes are limited to the limit values at Steps 120 to 135.

Consequently, according to the illustrated first embodiment, when the vehicle is under the condition where the target braking/driving force Fvn and the target yaw moment Mvn cannot be achieved by the control of the braking/driving force of each wheel, the vehicle target braking/driving force Fvt after the modification and the vehicle target yaw moment Mvt after the modification are calculated such that, within the range where the ratio of the vehicle target braking/driving force Fvt and the yaw moment Mvt after the modification through the control of the braking/driving forces of the wheels coincides with the ratio of the target braking/driving force Fvn and the target yaw moment Mvn through the control of the braking/driving forces of the wheels required to the vehicle, the vehicle braking/driving force Fv and the yaw moment Mv by the target braking/driving forces Fwxti of the wheels take the greatest values. Therefore, the braking/driving forces of the wheels are controlled such that the ratio of the vehicle braking/driving force and the yaw moment surely coincides with the ratio of the target braking/driving force and the target yaw moment, with the result that the braking/driving force and the yaw moment required to the vehicle can be achieved as much as possible within the range of the braking/driving force that can be generated by the wheels.

It is prevented that the vehicle target yaw moment Mvt after the modification and/or the vehicle target braking/driving force Fvt after the modification sharply change to increase or decrease even if the target braking/driving force Fvn and/or the target yaw moment Mvn sharply change due to a sharp acceleration or deceleration operation and/or a sharp steering operation by a driver. Therefore, a fear of the vehicle running stability deteriorating or an occupant of the vehicle feeling a sense of incongruity, which is caused by the sharp change in increase or decrease of the vehicle yaw moment and/or the braking/driving force, can effectively be reduced.

Figure 6C:
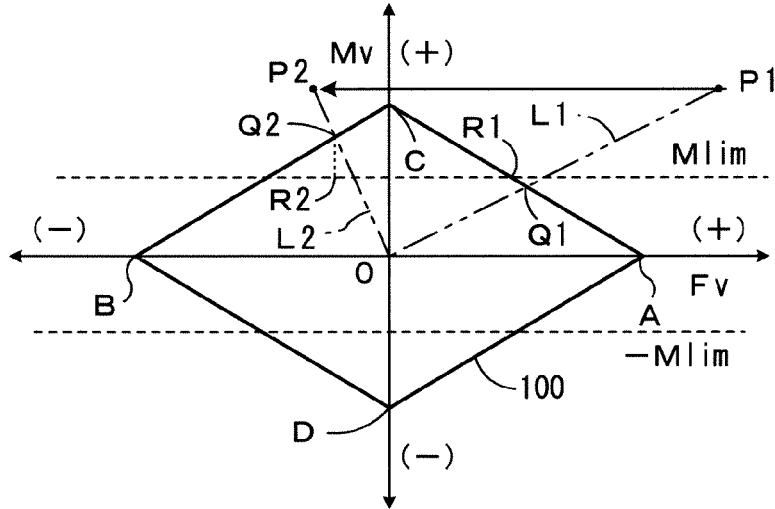
FIG. 6C is an explanatory view showing an operation of the first embodiment when the point indicating the vehicle target braking/driving force Fvn and the vehicle target yaw moment Mvn moves from a point P1 to a point P2 by the change in the vehicle target braking/driving force Fvn.

The case where the target braking/driving force Fvn sharply changes with a constant rate of change due to the sharp acceleration or deceleration operation by a driver, and the point indicating the target braking/driving force Fvn and the vehicle target yaw moment Mvn moves from the point P1 to the point P2 as shown in FIG. 6C is considered, for example. When the changes in the vehicle target braking/driving force Fvt after the modification and the vehicle target yaw moment Mvt after the modification are not limited, the point indicating the vehicle target braking/driving force Fvt after the modification and the vehicle target yaw moment Mvt after the modification moves like Q1→C→Q2 along the outer line of the quadrangle 100. With this movement, the vehicle yaw moment sharply increases or decreases.

On the other hand, according to the illustrated first embodiment, the vehicle target yaw moment Mvt after the modification is limited so as not to exceed the limit value Mlim. Therefore, even when the target braking/driving force Fvn sharply changes due to the sharp acceleration or deceleration operation by a driver and the point indicating the target braking/driving force Fvn and the vehicle target yaw moment Mvn moves from the point P1 to the point P2, the point indicating the vehicle target braking/driving force Fvt after the modification and the vehicle target yaw moment Mvt after the modification moves like Q1→R1→Q2, whereby the sharp increase or decrease of the vehicle yaw moment can surely be prevented.

Figure 7C:
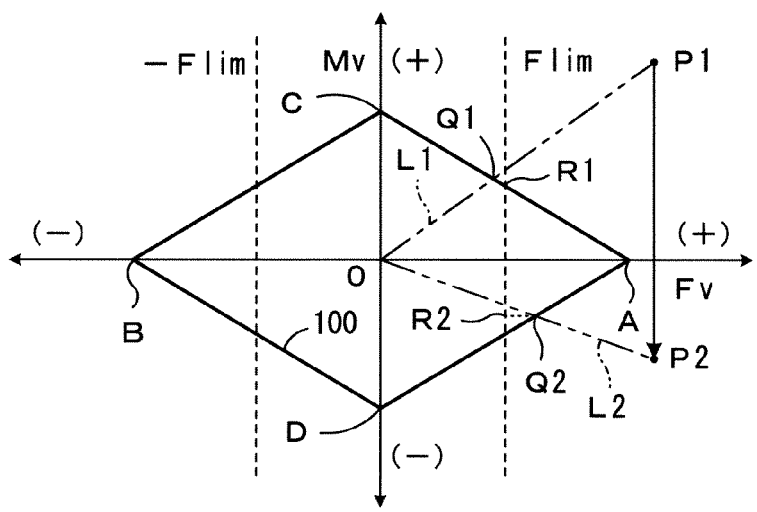
FIG. 7C is an explanatory view showing an operation of the first embodiment when the point indicating the vehicle target braking/driving force Fvn and the vehicle target yaw moment Mvn moves from the point P1 to the point P2 by the change in the vehicle target yaw moment Mvn.

Similarly, the case where the target yaw moment Mvn sharply changes due to the sharp steering operation by a driver, and the point indicating the target braking/driving force Fvn and the vehicle target yaw moment Mvn moves from the point P1 to the point P2 as shown in FIG. 7C is considered, for example. When the changes in the vehicle target braking/driving force Fvt after the modification and the vehicle target yaw moment Mvt after the modification are not limited, the point indicating the vehicle target braking/driving force Fvt after the modification and the vehicle target yaw moment Mvt after the modification moves like Q→A→Q2 along the outer line of the quadrangle 100. With this movement, the vehicle braking/driving force sharply increases or decreases.

On the other hand, according to the illustrated first embodiment, the vehicle target braking/driving force Fvt after the modification is limited so as not to exceed the limit value Flim. Therefore, even when the target yaw moment Mvn sharply changes due to the sharp steering operation by a driver and the point indicating the target braking/driving force Fvn and the vehicle target yaw moment Mvn moves from the point P1 to the point P2, the point indicating the vehicle target braking/driving force Fvt after the modification and the vehicle target yaw moment Mvt after the modification moves like Q1→R1→R2, whereby the sharp increase or decrease of the vehicle braking/driving force can surely be prevented.

Particularly, according to the illustrated first embodiment, the limit value Mlim is variably set, according to the absolute value of the rate of change Fvnd of the target braking/driving force Fvn, so as to be decreased as the absolute value of the rate of change Fvnd of the target braking/driving force Fvn increases, as shown in FIG. 8. The limit value Flim is variably set, according to the absolute value of the rate of change Mvnd of the target yaw moment Mvn, so as to be decreased as the absolute value of the rate of change Mvnd of the target yaw moment Mvn increases, as shown in FIG. 9. Therefore, as the fear of the vehicle yaw moment or the vehicle braking/driving force sharply increasing or decreasing is high, the severer limitation is imposed on the vehicle target yaw moment Mvt after the modification and the target braking/driving force Fvt after the modification. Accordingly, under the condition where an acceleration or deceleration operation and/or a steering operation by a driver are slow, the yaw moment and/or the braking/driving force required to the vehicle can surely be applied, and under the condition where an acceleration or deceleration operation and/or a steering operation by a driver are sharp, a sharp variation in the vehicle yaw moment and/or braking/driving force can surely be prevented. Further, compared to the case where the limit values Mlim and Flim are constant, the degree of the change in the vehicle yaw moment and/or braking/driving force during the sharp change in the speed in the acceleration or deceleration operation and/or steering operation by a driver can surely be reduced.

In the illustrated first embodiment, the driving sources for the wheels are electric motor generators 12FL to 12RR provided on each wheel. In case where the target braking/driving forces Fwxti of the wheels take negative values, which means the target braking/driving forces Fwxti are braking forces, the regenerative braking forces by the electric motor generators 12FL to 12RR are used. Accordingly, the vehicle motion energy can effectively be returned as electric energy upon the braking operation for deceleration, while achieving the braking/driving force and the yaw moment required to the vehicle as much as possible within the range of the braking/driving forces that can be generated by the wheels.

While, in the illustrated first embodiment, the electric motor generators 12FL to 12RR are in-wheel motors, the electric motor generators may be provided at the vehicle body. Further, the electric motor generators as driving sources for wheels may not perform regenerative braking. The driving source may be other than the electric motor generator so long as it can increase or decrease the driving force of each wheel independently. The same is true for a third embodiment described later.

Although the electric motor generators 12FL to 12RR are provided so as to correspond to four wheels in the illustrated first embodiment, this embodiment may be applied to a vehicle having driving sources provided only at the left and right front wheels or left and right rear wheels. In this case, the quadrangle 100 takes a form shown by 100' in FIG. 5B, and when the vehicle yaw moment in the leftward turning direction and the vehicle yaw moment in the rightward turning direction are the maximum values Mvlmax and Mvrmax respectively, the vehicle braking/driving force takes a negative value, which means that the vehicle braking/driving force is a braking force. The above-mentioned effects can also be achieved with this vehicle. The same is also true for the later-described third embodiment.

Second Embodiment

Figure 10:
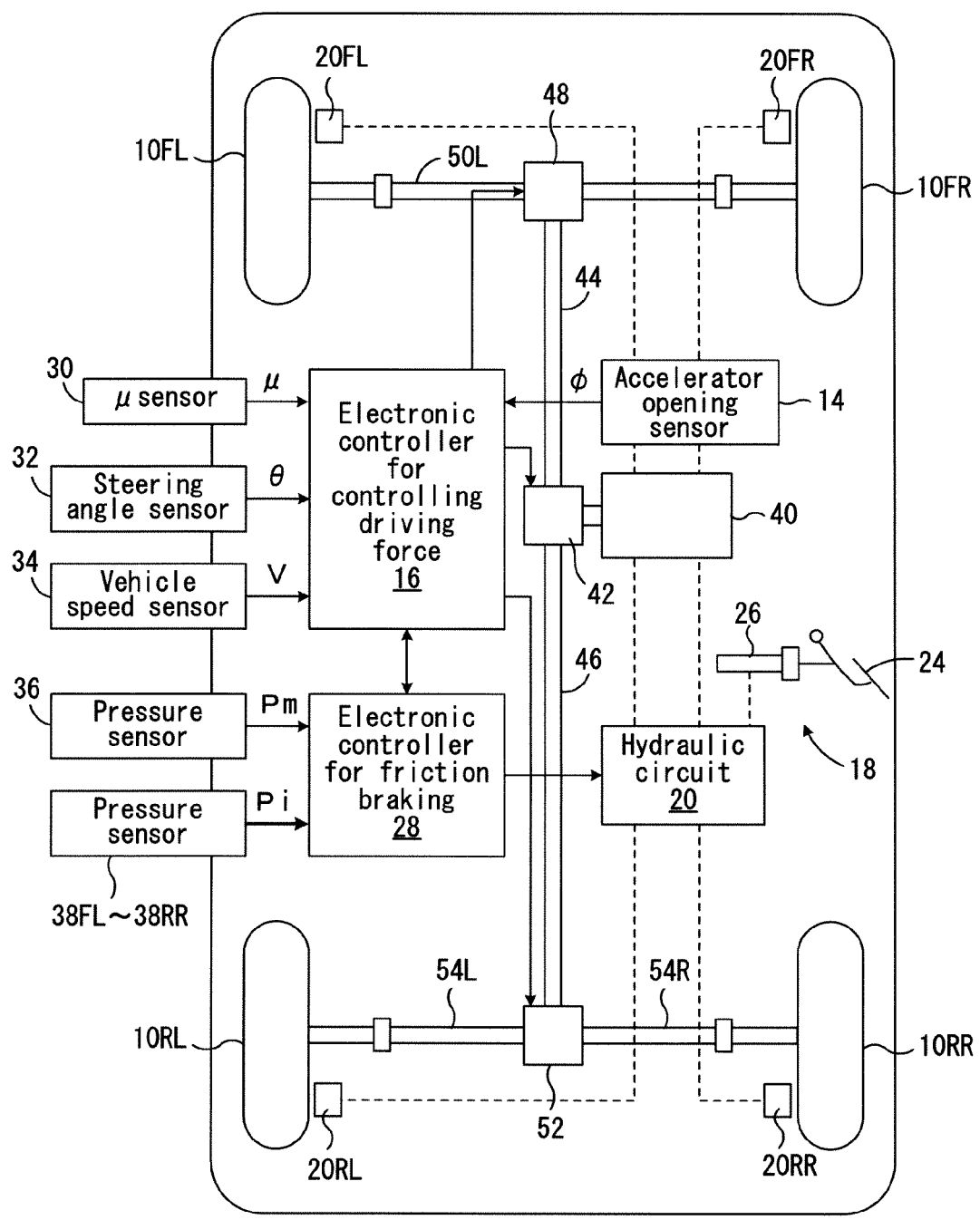
FIG. 10 is a schematic block diagram showing a vehicle braking/driving force control apparatus applied to a four-wheel-drive vehicle in which driving force and regenerative braking force from a single electric motor generator, which is common to four wheels, are controlled so as to be distributed to the four wheels according to a second embodiment of the present invention.

FIG. 10 is a schematic block diagram showing a braking/driving force control apparatus applied to a four-wheel-drive vehicle in which driving force and regenerative braking force from a single electric motor generator, which is common to four wheels, are controlled so as to be distributed to front and rear wheels and right and left wheels according to a second embodiment of the present invention. The components in FIG. 10 same as those in FIG. 1 are identified by the same numerals in FIG. 1.

In this second embodiment, an electric motor generator 40 is provided that serves as a driving source common to the front left wheel 10FL, front right wheel 10FR, rear left wheel 10RL, and rear right wheel 10RR. The driving force or the regenerative braking force from the electric motor generator 40 is transmitted to a front-wheel propeller shaft 44 and rear-wheel propeller shaft 46 through a center differential 42 that can control the distribution ratio to the front wheels and rear wheels.

The driving force or the regenerative braking force of the front-wheel propeller shaft 44 is transmitted to the front-left wheel axle 50L and front-right wheel axle 50R by a front-wheel differential 48 that can control the distribution ratio to the front-left wheel and front-right wheel, whereby the front-left wheel 10FL and front-right wheel 10FR are rotatably driven. Similarly, the driving force or the regenerative braking force of the rear-wheel propeller shaft 46 is transmitted to the rear-left wheel axle 54L and rear-right wheel axle 54R by a rear-wheel differential 52 that can control the distribution ratio of the rear-left wheel and rear-right wheel, whereby the rear-left wheel 10RL and rear-right wheel 10RR are rotatably driven.

The driving force of the electric motor generator 40 is controlled by the electronic controller 16 for controlling driving force on the basis of the accelerator opening $\phi$ detected by the accelerator opening sensor 14. The regenerative braking force of the electric motor generator 40 is also controlled by the electronic controller 16 for controlling driving force. The electronic controller 16 for controlling driving force controls the distribution ratio of the driving force and regenerative braking force to the front wheels and rear wheels by the center differential 42, controls the distribution ratio of the driving force and regenerative braking force to the left wheels and right wheels by the front-wheel differential 48, and controls the distribution ratio of the driving force and regenerative braking force to the left wheels and right wheels by the rear-wheel differential 52.

In this second embodiment too, the electronic controller 16 for controlling driving force calculates, in the same manner as in the first embodiment, the target braking/driving force Fvn, required to the vehicle, through the control of the braking/driving force of each wheel, the vehicle target yaw moment Mvn, required to the vehicle, through the control of the braking/driving force of each wheel, the vehicle maximum driving force Fvdmax, the vehicle maximum braking force Fvbmax, the vehicle maximum yaw moment Mvlmax in the leftward turning direction, and the vehicle maximum yaw moment Mvrmax in the rightward turning direction by the braking/driving force of each wheel.

In the illustrated second embodiment, it is assumed that the driving forces Fwdi of the wheels when the maximum driving force of the electric motor generator 40 is uniformly distributed to the front-left wheel 10FL, front-right wheel 10FR, rear-left wheel 10RL and rear-right wheel 10RR is smaller than the producible maximum longitudinal force that is determined by the friction coefficient μ of the normal road surface.

Figure 11A:
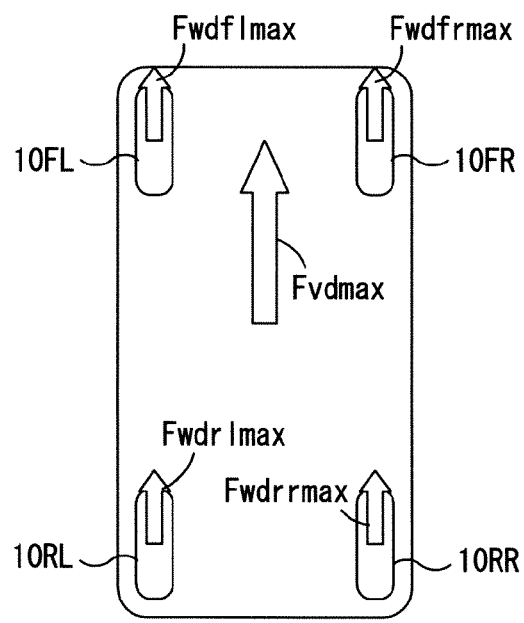
FIG. 11 is an explanatory view for explaining various cases of the relationship between a braking/driving force of each wheel and a vehicle braking/driving force and the relationship between a braking/driving force of each wheel and a vehicle yaw moment in the second embodiment.

As shown in FIG. 11A, the vehicle maximum driving force Fvdmax under the condition where the yaw moment by the braking/driving forces of the wheels is not acted on the vehicle is achieved when the braking/driving forces Fwxfl and Fwxfr of the front-left wheel 10FL and front-right wheel 10FR are the maximum driving forces Fwdflmax and Fwdfrmax in case where the distribution of the driving force to the right and left wheels is equal, and the braking/driving forces Fwxrl and Fwxrr of the rear-left wheel 10RL and rear-right wheel 10RR are the maximum driving forces Fwdrlmax and Fwdrrmax in case where the distribution of the driving force to the right and left wheels is equal.

Figure 11B:
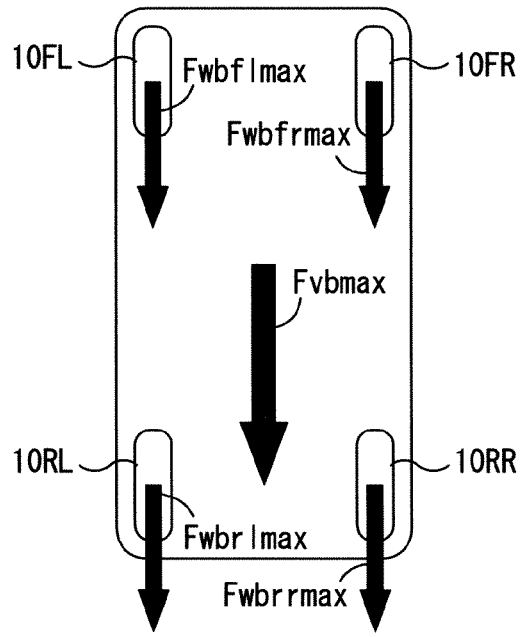

Similarly, as shown in FIG. 11B, the vehicle maximum braking force Fvbmax under the condition where the yaw moment by the braking/driving force of the wheels is not acted on the vehicle is achieved when the braking/driving forces Fwxfl and Fwxfr of the front-left wheel 10FL and front-right wheel 10FR are the maximum braking forces Fwbflmax and Fwbfrmax in case where the distribution of the braking force to the right and left wheels is equal, and the braking/driving forces Fwxrl and Fwxrr of the rear-left wheel 10RL and rear-right wheel 10RR are the maximum braking forces Fwbrlmax and Fwbrrmax in case where the distribution of the braking force to the right and left wheels is equal.

Figure 11C:
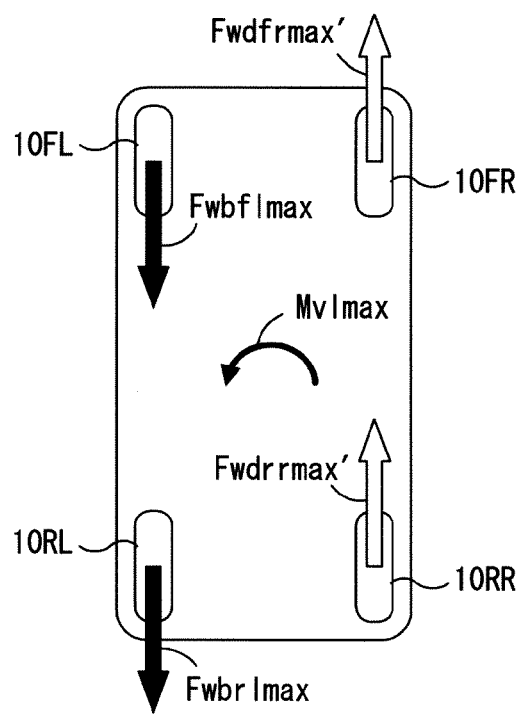

As shown in FIG. 11C, the vehicle maximum yaw moment Mvlmax in the leftward turning direction under the condition where the longitudinal force by the braking/driving forces of the wheels is not acted on the vehicle is achieved in case where the driving force is distributed to the right wheels, the braking/driving forces Fwxfr and Fwxrr of the front-right wheel 10FR and rear-right wheel 10RR are the maximum driving forces Fwdfrmax' and Fwdrrmax', and their magnitudes are equal to the magnitudes of the maximum braking forces Fwbflmax and Fwbrlmax of the front-left wheel 10FL and rear-left wheel 10RL respectively.

Figure 11D:
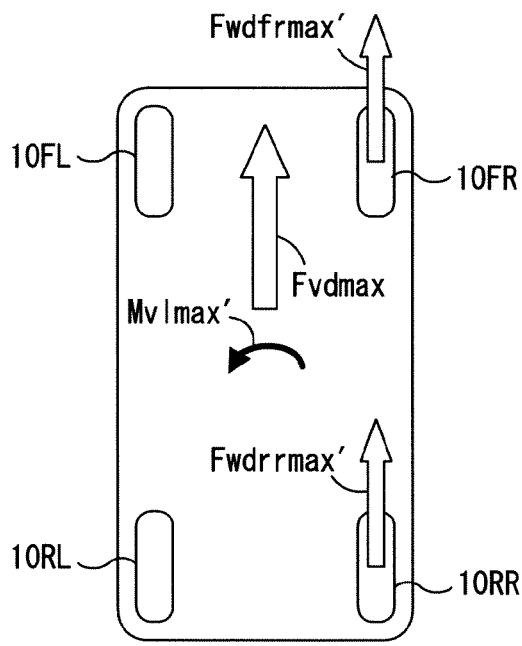

As shown in FIG. 11D, the vehicle maximum yaw moment Mvlmax' in the leftward turning direction under the condition where the vehicle braking/driving force is the maximum driving force Fvdmax is achieved in case where the braking/driving forces Fwxfl and Fwxrl of the front-left wheel 10FL and rear-left wheel 10RL are respectively 0, and the braking/driving forces Fwxfr and Fwxrr of the front-right wheel 10FR and rear-right wheel 10RR are the maximum driving forces Fwdflmax' and Fwdrrmax'.

Figure 12E:
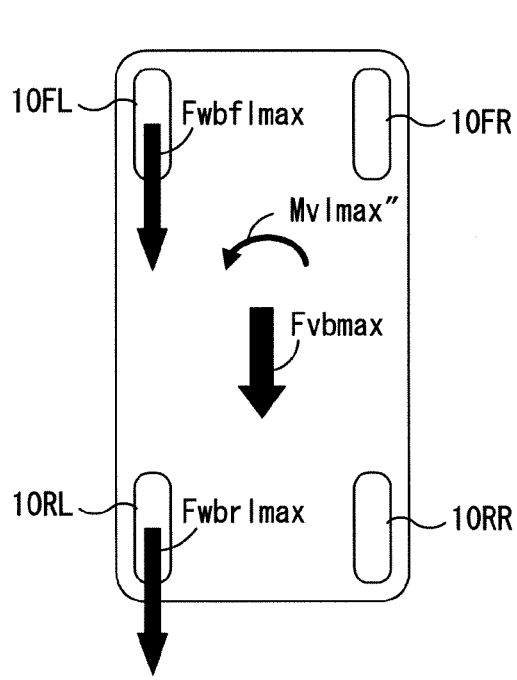
FIG. 12 is an explanatory view for explaining other various cases of the relationship between a braking/driving force of each wheel and a vehicle braking/driving force and the relationship between a braking/driving force of each wheel and a vehicle yaw moment in the second embodiment.

As shown in FIG. 12E, the vehicle maximum yaw moment Mvlmax" in the leftward turning direction under the condition where the driving force is not acted on any wheels is achieved in case where the braking/driving forces Fwxfr and Fwxrr of the front-right wheel 10FR and rear-right wheel 10RR are respectively 0, and the braking/driving forces Fwxfl and Fwxrl of the front-left wheel 10FL and rear-left wheel 10RL are the maximum braking forces Fwbflmax and Fwbrlmax.

Figure 12F:
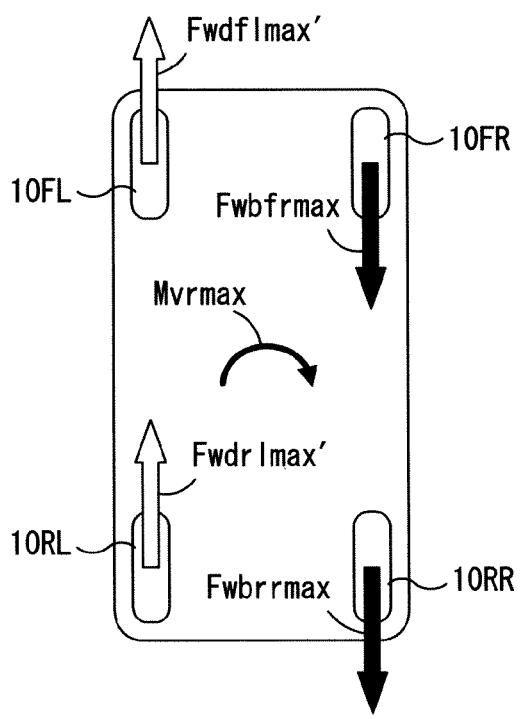

As shown in FIG. 12F, the vehicle maximum yaw moment Mvrmax in the rightward turning direction under the condition where the longitudinal force by the braking/driving forces of the wheels is not acted on the vehicle is achieved in case where the driving force is distributed to the left wheels, the braking/driving forces Fwxfl and Fwxrl of the front-left wheel 10FL and rear-left wheel 10RL are the maximum driving forces Fwdflmax' and Fwdrlmax', and their magnitudes are equal to the magnitudes of the maximum braking forces Fwbfrmax and Fwbrrmax of the front-right wheel 10FR and rear-right wheel 10RR respectively.

Figure 12G:
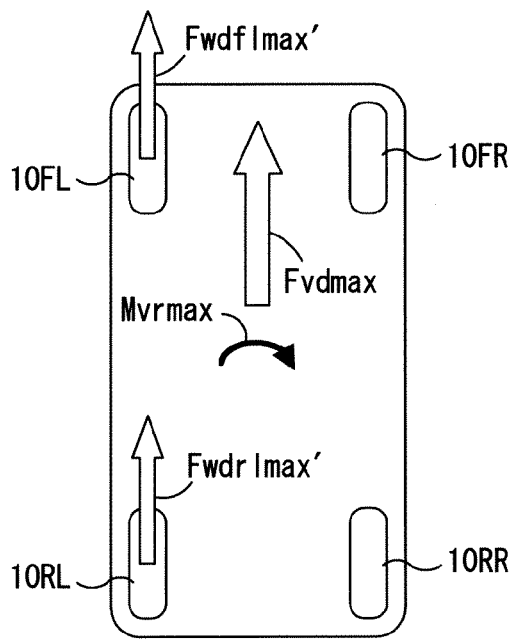

As shown in FIG. 12G, the vehicle maximum yaw moment Mvrmax' in the rightward turning direction under the condition where the vehicle braking/driving force is the maximum driving force Fvdmax is achieved in case where the braking/driving forces Fwxfr and Fwxrr of the front-right wheel 10FR and rear-right wheel 10RR are respectively 0, and the braking/driving forces Fwxfl and Fwxrl of the front-left wheel 10FL and rear-left wheel 10RL are the maximum driving forces Fwdflmax' and Fwdrlmax'.

Figure 12H:
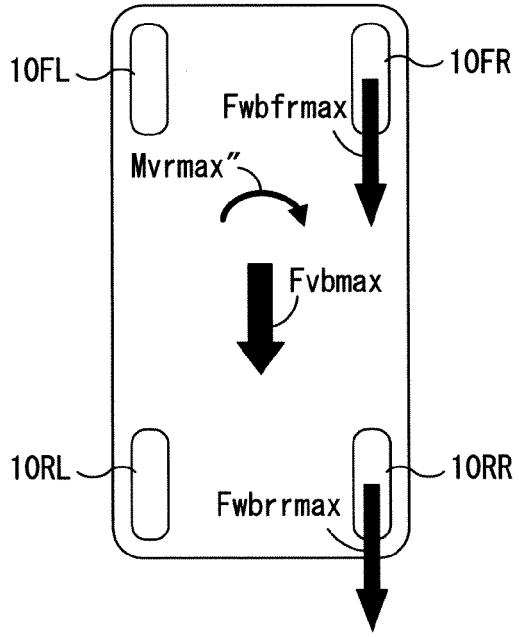

As shown in FIG. 12H, the vehicle maximum yaw moment Mvrmax" in the rightward turning direction under the condition where the driving force is not acted on any wheels is achieved in case where the braking/driving forces Fwxfl and Fwxrl of the front-left wheel 10FL and rear-left wheel 10RL are respectively 0, and the braking/driving forces Fwxfr and Fwxrr of the front-right wheel 10FR and rear-right wheel 10RR are the maximum braking forces Fwbfrmax and Fwbrrmax.

The maximum driving forces Fwdimax of the wheels are determined by the maximum output torque of the electric motor generator 40, the road friction coefficient μ, and each distribution ratio, and the maximum braking forces Fwbimax of the wheels are determined by the road friction coefficient μ. Therefore, the vehicle maximum driving force Fvdmax, vehicle maximum braking force Fvbmax, vehicle maximum yaw moment Mvlmax in the leftward turning direction, and vehicle maximum yaw moment Mvrmax in the rightward turning direction are also determined by the maximum output torque of the electric motor generator 40 and the road friction coefficient μ. Accordingly, if the maximum output torque of the electric motor generator 40 and the road friction coefficient μ are found, the vehicle maximum driving force Fvdmax and the other values can be estimated.

Figure 15A:
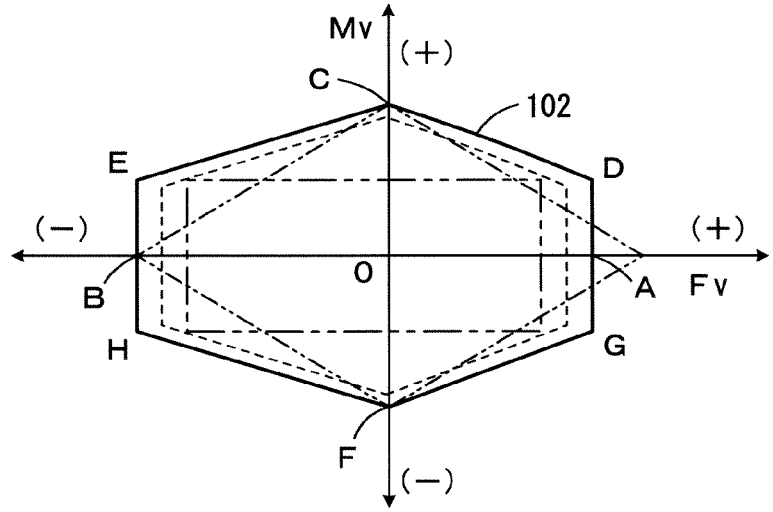
FIG. 15A is a graph showing the range, that can be achieved by the braking/driving forces of the wheels, of the vehicle braking/driving force and vehicle yaw moment in the second embodiment.

As shown in FIG. 15A, in a rectangular coordinate with the vehicle braking/driving force Fvx as abscissa and the vehicle yaw moment Mv as ordinate, the vehicle braking/driving force Fvx and the vehicle yaw moment Mv that are attainable by the control of the braking/driving force of each wheel take values within a hexagon102 decided by the vehicle maximum driving force Fvdmax, vehicle maximum braking force Fvbmax, vehicle maximum yaw moment Mvlmax in the leftward turning direction, vehicle maximum yaw moment Mvrmax in the rightward turning direction, and the vehicle maximum driving force Fvdmax'.

Figure 15B:
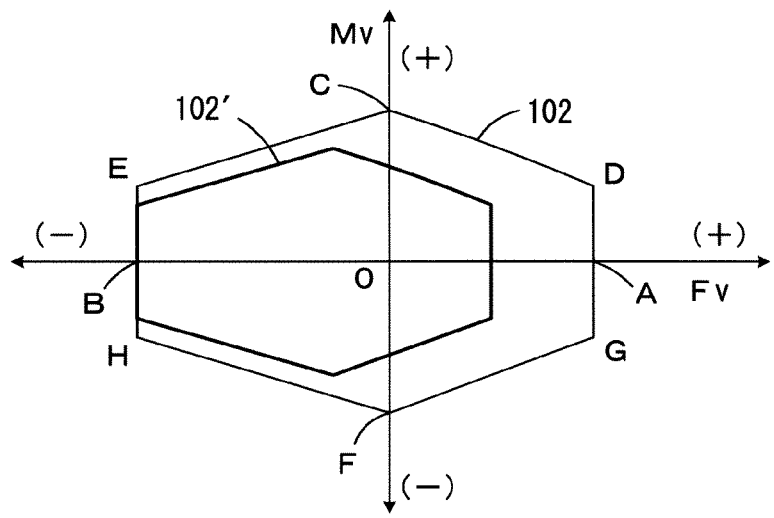
FIG. 15B is an explanatory view showing the range, that can be achieved by the control of the braking/driving forces of the wheels, of the vehicle target braking/driving force Fvn and the vehicle target yaw moment Mvn in the vehicle having a driving source provided only at the right and left front wheels or at the right and left rear wheels in the second embodiment.

Notably, in FIG. 15, points A to H correspond to the cases A to H in FIGS. 11 and 12. As shown by a broken line in FIG. 15A, the hexagon 102 becomes small as the road friction coefficient μ decreases. Further, as the magnitude of the steering angle θ increases, the lateral force of front left and front right wheels, that are steerable wheels, increases, so that the allowance of the longitudinal force becomes small. Therefore, the hexagon102 becomes small as magnitude of the steering angle θ increases.

When the output torque of the electric motor generator 40 is sufficiently great, the maximum driving force and maximum braking force of each wheel are determined by the road friction coefficient μ. Therefore, supposing that the vehicle accelerating direction and the vehicle leftward turning direction are defined as positive, the relationships between the maximum driving force and maximum braking force of each wheel, the vehicle maximum driving force and vehicle maximum braking force, and vehicle maximum yaw moment in the leftward turning direction and vehicle maximum yaw moment in the rightward turning direction are equal to those in the above-mentioned first embodiment. Accordingly, the range of the vehicle driving force and yaw moment that can be achieved by the braking/driving forces of the wheels becomes the range of the diamond like the first embodiment as shown by a phantom line in FIG. 15.

Further, when the output torque of the electric motor generator 40 and the maximum braking force of each wheel are smaller than those in the embodiment, the vehicle driving force becomes the maximum even if all the maximum driving force is distributed to the left wheels or right wheels, and the vehicle braking force becomes the maximum even if all the braking forces is distributed to the left wheels or right wheels. Therefore, as indicated by the phantom line in FIG. 15A, the range of the vehicle driving force and yaw moment that can be achieved by the braking/driving forces of the wheels becomes the range of the rectangle.

The coordinates at the points A to H shown in FIG. 15 are (Fvdmax, 0), (Fvbmax, 0), (0, Mvlmax), (Fvdmax, KmMvlmax), (Fvbmax, KmMvlmax), (0, Mvrmax), (Fvdmax, −KmMvlmax), and (Fvbmax, −KmMvlmax), respectively, supposing that the coefficient Km is defined as not less than 0 and not more than 1.

Supposing that the longitudinal distribution ratio of the braking/driving force Fwxi to the rear wheels is defined as Kr (constant of 0<Kr<1), the lateral distribution ratio of the braking/driving force Fwxi to the right wheels is defined as Ky (0≦Kr≦1) for the front wheels and rear wheels, and the vehicle tread is defined as Tr, the following equations 4 to 7 are established. Accordingly, the electronic controller 16 for controlling driving force sets the vehicle target braking/driving force Fvt and the vehicle target yaw moment Mvt after the modification by the control of the braking/driving force of each wheel to the target braking/driving force Fvn and the vehicle target yaw moment Mvn, when the vehicle target braking/driving force Fvt and the vehicle target yaw moment Mvt are within the above-mentioned hexagon 102. For example, it calculates the values satisfying the following equations 4 to 7 as the target braking/driving force Fwxti (i=fl, fr, rl, rr) and the lateral distribution ratio Ky to the right wheels by the least square method.

$$Fwxfl+Fwxfr+Fwxrl+Fwxrr=Fvt \quad (4)$$

$$\{Fwxfr+Fwxrr-(Fwxfl+Fwxrl)\}Tr/2=Mvt \quad (5)$$

$$(Fwxfl+Fwxfr)Kr=(Fwxrl+Fwxrr)(1-Kr) \quad (6)$$

$$(Fwxfl+Fwxrl)Ky=(Fwxfr+Fwxrr)(1-Ky) \quad (7)$$

When the vehicle target braking/driving force Fvn and the vehicle target yaw moment Mvn are outside the range of the above-mentioned hexagon 102, the electronic controller 16 for controlling driving force calculates the vehicle target braking/driving force Fvt and the vehicle target yaw moment Mvt such that the magnitude of the vehicle braking/driving force Fv and the magnitude of the yaw moment Mv by the target braking/driving forces Fwxti of the wheels become respectively the maximum within the range where the ratio of the vehicle target braking/driving force Fvt and the yaw moment Mvt by the braking/driving forces of the wheels becomes the ratio of the target braking/driving force Fvn and the target yaw moment Mvn, required to the vehicle, by the braking/driving forces of the wheels, like the above-mentioned first embodiment. Then, the electronic controller 16 for controlling driving force calculates the values satisfying the foregoing equations 4 to 7 as the target braking/driving forces Fwxti of the wheels by the least square method, for example.

The electronic controller 16 for controlling driving force calculates the limit value Mlim of the vehicle target yaw moment Mvt on the basis of the magnitude of the rate of change of the target braking/driving force Fvn in such a manner that, as the magnitude of the rate of change of the target braking/driving force Fvn is great, the limit value Mlim of the vehicle target yaw moment Mvt becomes small, and calculates the limit values Fdlim and Fblim of the vehicle target braking/driving force Fvt on the basis of the magnitude of the rate of change of the target yaw moment Mvn in such a manner that, as the magnitude of the rate of change of the target yaw moment Mvn is great, the limit values Fdlim and Fblim of the vehicle target braking/driving force Fvt become small.

When the magnitude of the vehicle target yaw moment Mvt after the modification exceeds the limit value Mlim, the electronic controller 16 for controlling driving force corrects the magnitude of the target yaw moment Mvt to the limit value Mlim. When the magnitude of the vehicle target braking/driving force Fvt after the modification exceeds the limit value Fdlim, the electronic controller 16 for controlling driving force corrects the magnitude of the target braking/driving force Fvt to the limit value Fdlim. When the magnitude of the vehicle target braking/driving force Fvt after the modification is less than the limit value Fblim, the electronic controller 16 for controlling driving force corrects the magnitude of the target braking/driving force Fvt to the limit value Fblim. Accordingly, this configuration prevents a sharp change in the increase or decrease of the vehicle target braking/driving force Fvt and/or the vehicle target yaw moment Mvt involved with the sharp change in the target braking/driving force Fvn and/or the target yaw moment Mvn.

When the vehicle braking/driving force Fv takes a positive value which means the vehicle braking/driving force Fv is a driving force, and the target braking/driving forces Fwxti of the wheels are positive values that means the braking/driving forces Fwxti are driving forces, the electronic controller 16 for controlling driving force sets the target friction braking forces Fwbti and the target regenerative braking forces Fwrti (i=fl, fr, rl, rr) of the wheels to zero, outputs the signals indicating the target friction braking forces Fwbti to the electronic controller 28 for controlling braking force, and sets the target driving forces Fwdti (i=fl, fr, rl, rr) of the wheels to the target braking/driving forces Fwxti.

Then, the electronic controller 16 for controlling driving force calculates the target driving current It to the electric motor generator 40 and the lateral distribution ratio Ky to the right wheels by unillustrated maps or functions on the basis of the target driving forces Fwdti, and controls the driving current applied to the electric motor generator 40 on the basis of the target driving current It as well as controls the front-wheel differential 48 and the rear-wheel differential 52 on the basis of the lateral distribution ratio Ky to the right wheels, thereby controlling the driving force of each wheel such that the braking/driving forces Fwxi of the wheels becomes the target braking/driving force Fwxti.

On the other hand, when the vehicle braking/driving force Fv takes a positive value that means the vehicle braking/driving force Fv is a driving force, but the target braking/driving force Fwxti of any one of wheels takes a negative value that means it is a braking force, and when the vehicle braking/driving force Fv takes a negative value that means it is a braking force, but the target braking/driving force Fwxti of any one of wheels takes a positive value that means it is a driving force, the electronic controller 16 for controlling driving force determines the lateral distribution ratio Ky to the right wheels such that the driving force is distributed only to the side where the target braking/driving forces Fwxti take positive values, calculates the target driving current It to the electric motor generator 40 on the basis of the sum of the positive target braking/driving forces Fwxti, and outputs signals indicating the target braking/driving forces Fwxti to the electronic controller 28 for controlling braking force such that the friction braking force by the friction braking device 18 is applied to the wheel having the negative target braking/driving force Fwxti.

Then, the electronic controller 16 for controlling driving force controls the driving current applied to the electric motor generator 40 on the basis of the target driving current It, and controls the front-wheel differential 48 and the rear-wheel differential 52 on the basis of the lateral distribution ratio Ky to the right wheels. The electronic controller 28 for controlling braking force applies the friction braking force according to the target braking/driving force Fwxti to the wheel having the negative target braking/driving force Fwxti. Accordingly, the braking/driving forces Fwxi of the wheels are controlled to coincide with the target braking/driving forces Fwxti.

When the sum of the target braking/driving forces Fwxti is not more than the maximum regenerative braking force by the electric motor generator 40 in case where the vehicle braking/driving force Fv takes a negative value that means it is a braking force, and the target braking/driving forces Fwxti of the wheels take negative values that means they are braking forces, the electronic controller 16 for controlling driving force sets the target driving forces Fwdti and the target friction braking forces Fwbti of the wheels to 0, and sets the target regenerative braking force Frt to the sum of the target braking/driving forces Fwxti, thereby controlling the lateral distribution ratio Ky to the right wheels and the electric motor generator 40 such that the regenerative braking force becomes the target regenerative braking force Frt.

When the magnitude of the target braking/driving force Fwxti of any one of wheels is greater than the maximum regenerative braking force by the electric motor generator 40 in case where the vehicle braking/driving force Fv takes a negative value that means it is a braking force, and the target braking/driving forces Fwxti of the wheels take negative values that means they are braking forces, the electronic controller 16 for controlling driving force sets the target driving forces Fwdti of the wheels to 0, sets the regenerative braking force by the electric motor generator 40 to the maximum regenerative braking force, and sets the lateral distribution ratio Ky to the right wheels such that the distribution ratio of the regenerative braking force to the wheel having the greater target braking/driving force Fwxti increases.

Then, the electronic controller 16 for controlling driving force calculates, as the target friction braking forces Fwbti, the values obtained by the subtraction from the target braking/driving forces Fwxti of the wheels the associated regenerative braking forces of the wheels, and outputs the signals indicating the target friction braking forces Fwbti to the electronic controller 28 for controlling braking force. Further, the electronic controller 16 for controlling driving force controls the electric motor generator 40 such that the regenerative braking force becomes the maximum regenerative braking force, and controls the front-wheel differential 48 and the rear-wheel differential 52 on the basis of the lateral distribution ratio Ky to the right wheels.

In this second embodiment too, the electronic controller 28 for controlling braking force calculates the target braking pressures Pbti (i=fl, fr, rl, rr) of the wheels on the basis of the target friction braking forces Fwbti of the wheels inputted from the electronic controller 16 for controlling driving force, and controls the hydraulic circuit 20 such that the braking pressures Pbi of the wheels becomes the associated target braking pressures Pbti, thereby controlling such that the friction braking forces Fwbi (i=fl, fr, rl, rr) of the wheels become the associated target friction braking forces Fwbti of the wheels.

Figure 13:
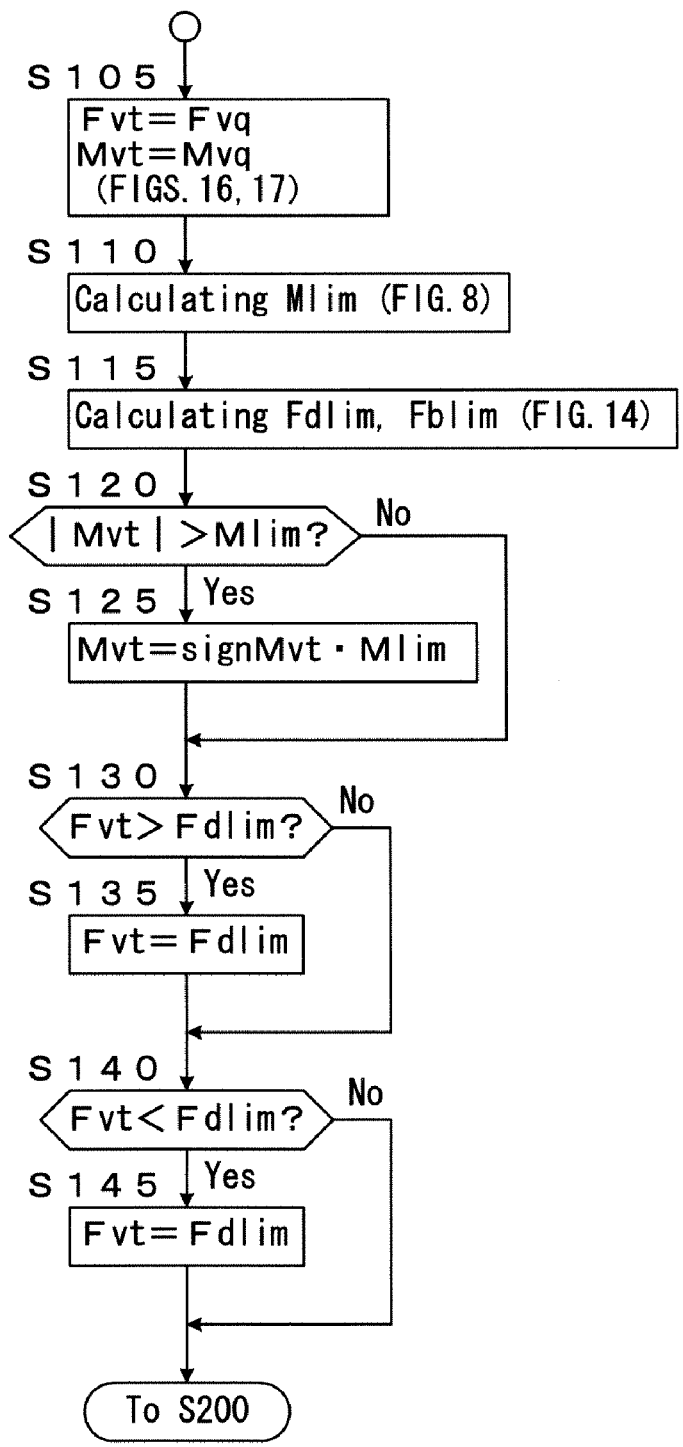
FIG. 13 is a flowchart showing a calculation routine of the target braking/driving force Fvt after the modification and the yaw moment Mvt after the modification achieved by the electronic controller for controlling driving force in the second embodiment.

Explained next with reference to the flowchart shown in FIG. 13 is a calculation routine of the vehicle target braking/driving force Fvt after the modification and the vehicle target yaw moment Mvt after the modification under the condition where the target braking/driving force Fvn and the target yaw moment Mvn cannot be achieved by the braking/driving forces of the wheels according to the second embodiment.

Steps in FIG. 13 same as Steps shown in FIG. 4 are identified by the same numbers in FIG. 4. Although not shown in the figure, in this second embodiment, Steps 10 to 50 and Steps 200 to 220 are executed in the same manner as in the first embodiment, and Steps 105, 110, 120, and 125 are executed in the same manner as in the first embodiment. At Step 105 in particular, the point of intersection Q of the segment L, which links the point P that shows the vehicle target braking/driving force Fvn and the vehicle target yaw moment Mvn and the origin O, and the outer line of the hexagon 102 is obtained as the target point, and the vehicle target braking/driving force Fvt after the modification and the vehicle target yaw moment Mvt after the modification are set respectively to Fvq and Mvq that are the values at the target point Q.

Figure 14:
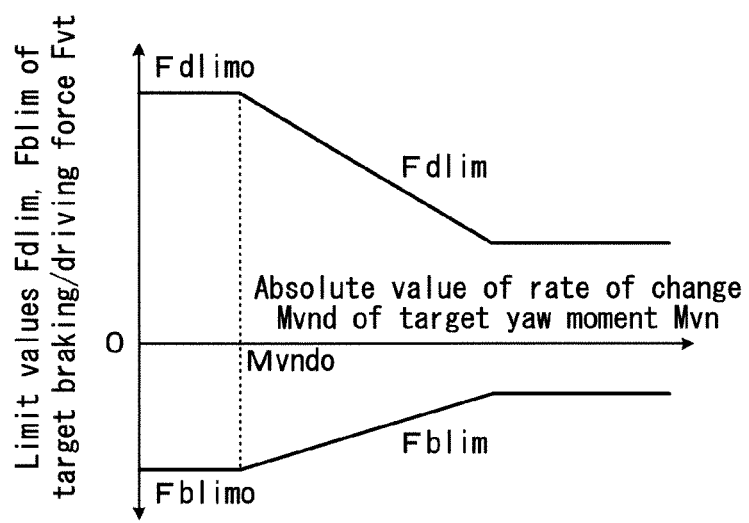
FIG. 14 is a graph showing a relationship between the absolute value of the rate of change Mvnd of the target yaw moment Mvn and limit values Fdlim and Fblim of the vehicle target braking/driving force Fvt.

At Step 115, the limit values Fdlim and Fblim of the vehicle target braking/driving force Fvt are calculated from the map corresponding to the graph shown in FIG. 14 on the basis of the absolute value of the rate of change Mvnd of the vehicle target yaw moment Mvt.

At Step 130, it is determined whether or not the vehicle target braking/driving force Fvt after the modification exceeds the limit value Fdlimo. When a negative determination is made, the program proceeds to Step 200, and when a positive determination is made, the vehicle target braking/driving force Fvt after the modification is corrected to Fdlim at Step 135. Thereafter, the program proceeds to Step 140.

At Step 140, it is determined whether or not the vehicle target braking/driving force Fvt after the modification is less than the limit value Fblimo. When a negative determination is made, the program proceeds to Step 200, and when a positive determination is made, the vehicle target braking/driving force Fvt after the modification is corrected to Fblim at Step 145. Thereafter, the program proceeds to Step 200.

The control same as that in the above-mentioned first embodiment is executed at Step 210 in this second embodiment, except that the target regenerative braking force Frt and the target friction braking forces Fwbti of the wheels are calculated as described above.

Consequently, according to the illustrated second embodiment, when the target braking/driving force Fvn and the target yaw moment Mvn cannot be achieved by the control of the braking/driving forces of the wheels, Steps 105 to 145 are executed. When the magnitudes of the vehicle target braking/driving force Fvt after the modification and the vehicle target yaw moment Mvt after the modification exceed the limit value Flim and the limit values Mdlim and Mblim, respectively, these magnitudes are limited to the limit values. Therefore, like the aforesaid first embodiment, the braking/driving force and the yaw moment required to the vehicle can be achieved as much as possible within the range of the braking/driving forces generated by the wheels, and further, a fear of the vehicle running stability deteriorating or an occupant of the vehicle feeling a sense of incongruity, which is caused by the sharp change in increase and/or decrease of the vehicle yaw moment or the braking/driving force, can effectively be reduced.

Figure 16A:
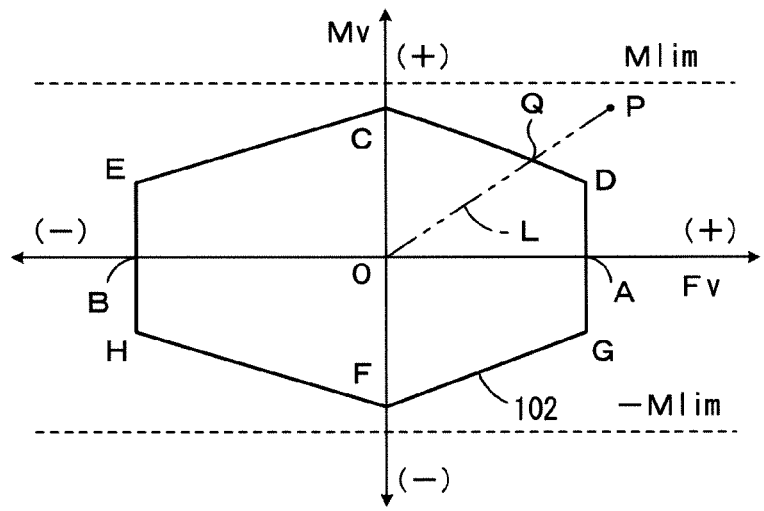
FIGS. 16A and 16B are explanatory views showing a manner of a calculation of the vehicle target braking/driving force Fvt after the modification and the vehicle target yaw moment Mvt after the modification in case where the vehicle target braking/driving force Fvn and the vehicle target yaw moment Mvn are outside the range that can be achieved by the control of the braking/driving forces of the wheels in the second embodiment.
Figure 16B:
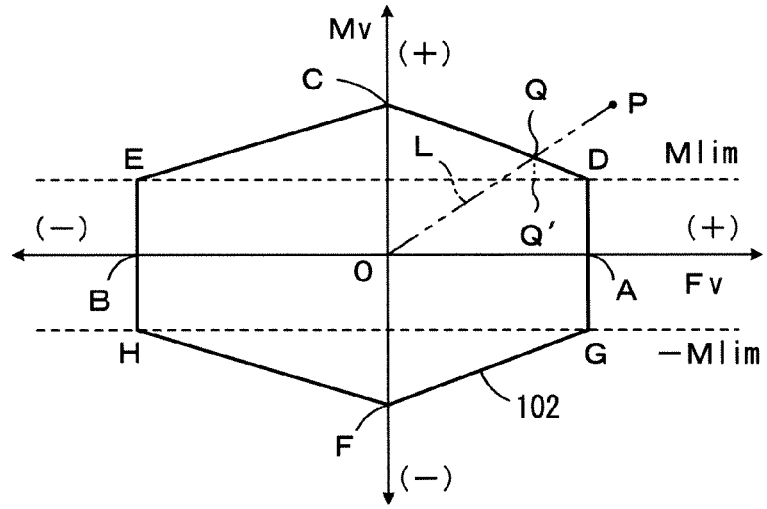
Figure 16C:
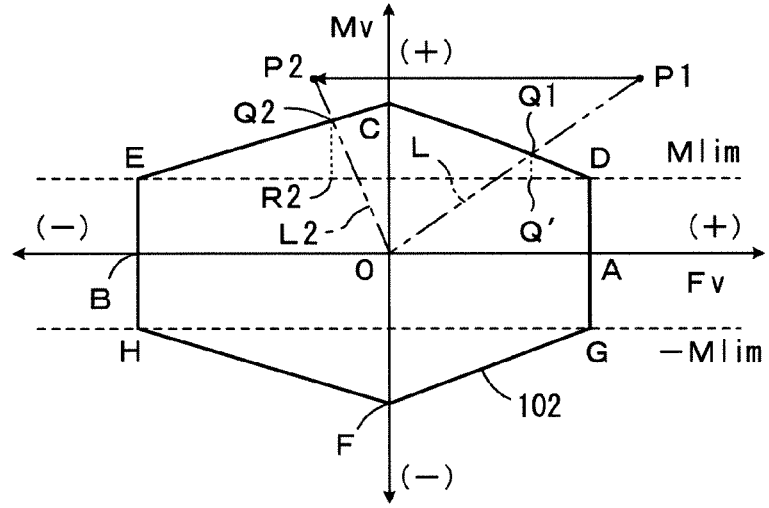
FIG. 16C is an explanatory view showing an operation of the second embodiment when the point indicating the vehicle target braking/driving force Fvn and the vehicle target yaw moment Mvn moves from the point P1 to the point P2 by the change in the vehicle target braking/driving force Fvn.

The case where the target braking/driving force Fvn sharply changes with a constant rate due to the sharp acceleration or deceleration operation by a driver, and the point indicating the target braking/driving force Fvn and the vehicle target yaw moment Mvn moves from the point P1 to the point P2 as shown in FIG. 16C is considered, for example. When the changes in the vehicle target braking/driving force Fvt after the modification and the vehicle target yaw moment Mvt after the modification are not limited, the point indicating the vehicle target braking/driving force Fvt after the modification and the vehicle target yaw moment Mvt after the modification moves like Q1→C→Q2 along the outer line of the hexagon 102. With this movement, the vehicle yaw moment sharply increases once, and then, decreases.

On the other hand, according to the illustrated second embodiment, the vehicle target yaw moment Mvt after the modification is limited so as not to exceed the limit value Mlim. Therefore, even when the target braking/driving force Fvn sharply changes due to the sharp acceleration or deceleration operation by a driver and the point indicating the target braking/driving force Fvn and the vehicle target yaw moment Mvn moves from the point P1 to the point P2, the point indicating the vehicle target braking/driving force Fvt after the modification and the vehicle target yaw moment Mvt after the modification moves like Q'→R2 along the line indicating the limit value Mlim, whereby the sharp increase or decrease of the vehicle yaw moment can surely be prevented.

Figure 17A:
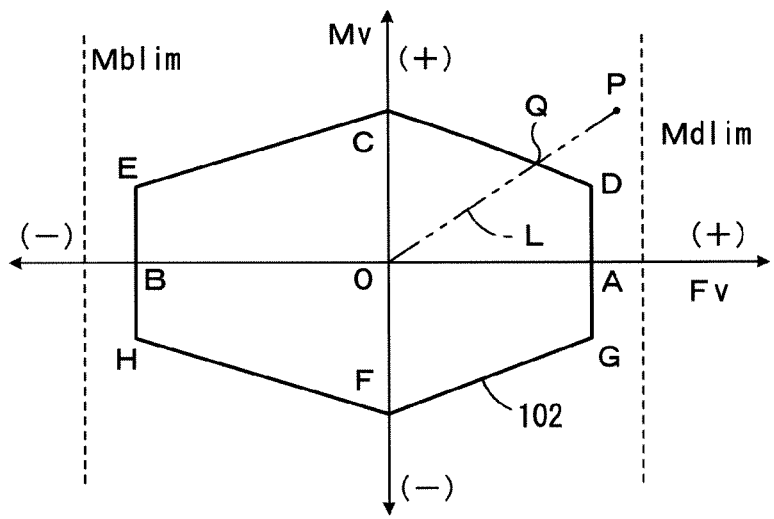
FIGS. 17A and 17B are explanatory views showing a manner of a calculation of the vehicle target braking/driving force Fvt after the modification and the vehicle target yaw moment Mvt after the modification in case where the vehicle target braking/driving force Fvn and the vehicle target yaw moment Mvn are outside the range that can be achieved by the control of the braking/driving forces of the wheels in the second embodiment.
Figure 17B:
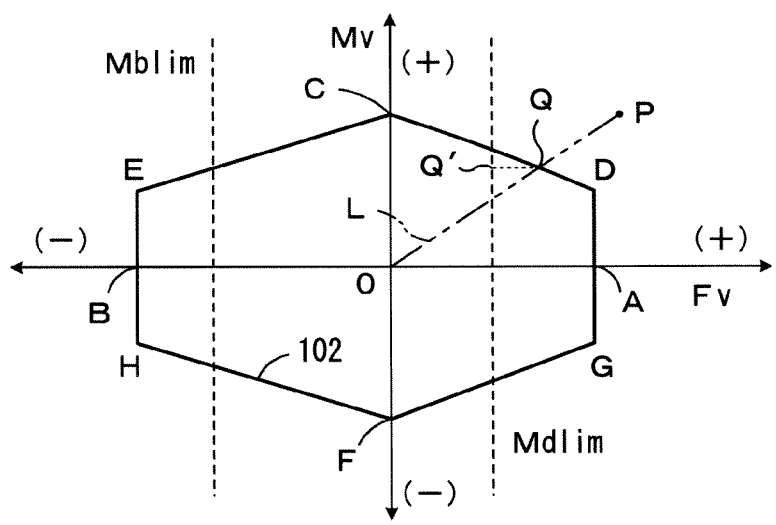
Figure 17C:
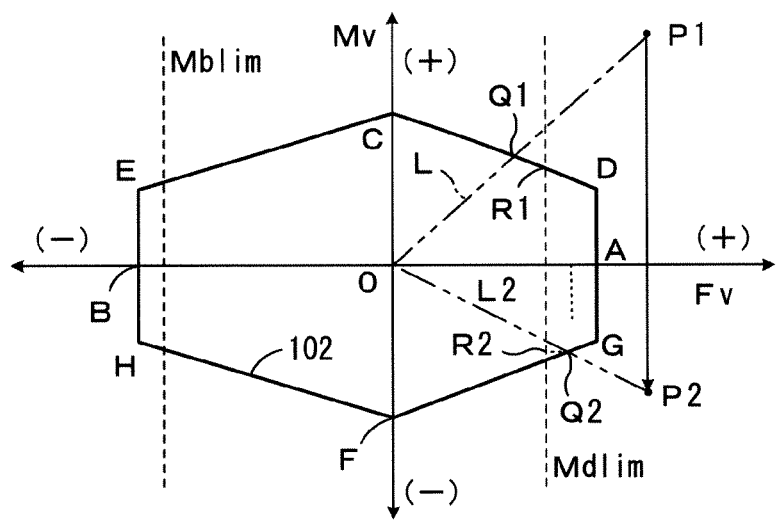
FIG. 17C is an explanatory view showing an operation of the second embodiment when the point indicating the vehicle target braking/driving force Fvn and the vehicle target yaw moment Mvn moves from the point P1 to the point P2 by the change in the vehicle target yaw moment Mvn.

Similarly, the case where the target yaw moment Mvn sharply changes due to the sharp steering operation by a driver, and the point indicating the target braking/driving force Fvn and the vehicle target yaw moment Mvn moves from the point P1 to the point P2 as shown in FIG. 17C is considered, for example. When the changes in the vehicle target braking/driving force Fvt after the modification and the vehicle target yaw moment Mvt after the modification are not limited, the point indicating the vehicle target braking/driving force Fvt after the modification and the vehicle target yaw moment Mvt after the modification moves like Q1→D→A→G→Q2 along the outer line of the hexagon 102. With this movement, the vehicle braking/driving force sharply increases or decreases.

On the other hand, according to the illustrated second embodiment, the vehicle target braking/driving force Fvt after the modification is limited so as not to exceed the limit value Flim. Therefore, even when the target yaw moment Mvn sharply changes due to the sharp steering operation by a driver and the point indicating the target braking/driving force Fvn and the vehicle target yaw moment Mvn moves from the point P1 to the point P2, the point indicating the vehicle target braking/driving force Fvt after the modification and the vehicle target yaw moment Mvt after the modification moves like Q1→R1→R2 along the line indicating the limit value Flim, whereby the sharp increase or decrease of the vehicle braking/driving force can surely be prevented.

According to the illustrated second embodiment, in particular, the electric motor generator 40 that is common to all the wheels and serves as a driving source generates a regenerative braking force, in case where the vehicle target braking/driving force Fvt takes a negative value that means it is a braking force. Therefore, like the above-mentioned first embodiment, the vehicle motion energy can effectively be returned as electric energy upon the braking operation for deceleration, while achieving the braking/driving force and the yaw moment required to the vehicle as much as possible within the range of the braking/driving force that can be generated by each wheel. The same is true for the third embodiment described later.

Although the driving source is the electric motor generator 40 that is common to four wheels in the illustrated second embodiment, the driving source for driving the wheels so as to execute the control of the driving force distribution between left and right wheels may be optional driving means known by a person skilled in the art, such as an internal combustion engine, hybrid system, or the like.

Although a single electric motor generator 40 is provided as a common driving source to four wheels in the illustrated second embodiment, a driving source common to the front-left wheel and front-right wheel and a driving source common to the rear-left wheel and rear-right wheel may be provided. Further, a driving source common to only the front-left wheel and front-right wheel or a driving source common to only the rear-left wheel and rear-right wheel may be provided. In this case, the hexagon 102 takes a shape 102' shown in FIG. 15B. Specifically, when the vehicle yaw moment in the leftward turning direction and the vehicle yaw moment in the rightward turning direction are the maximum values Mvlmax and Mvrmax respectively, the vehicle braking/driving force takes a negative value, which means that the vehicle braking/driving force is a braking force. The above-mentioned effects can also be achieved by this vehicle. The same is true for the later-described third embodiment.

Third Embodiment

Figure 18:
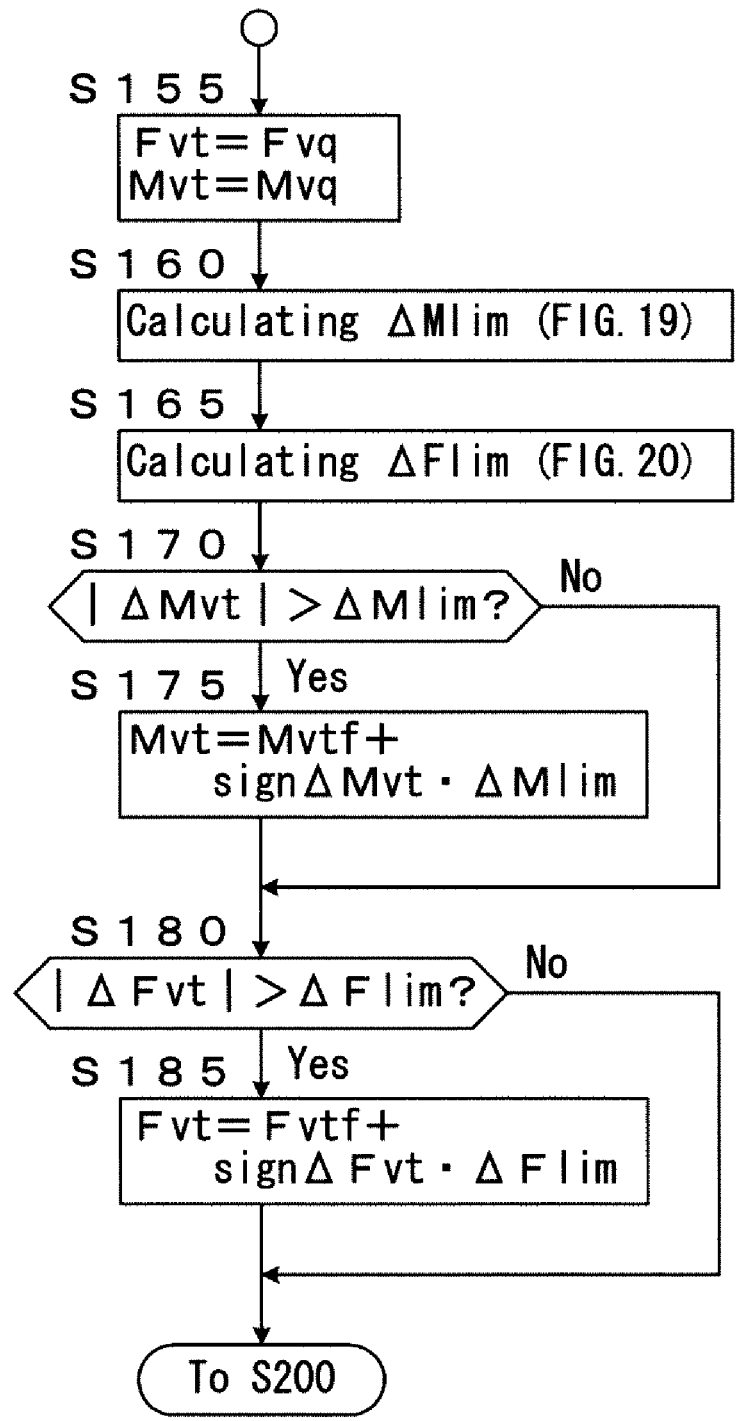
FIG. 18 is a flowchart showing a calculation routine of the target braking/driving force Fvt after the modification and the yaw moment Mvt after the modification achieved by the electronic controller for controlling driving force in a third embodiment.

FIG. 18 is a flowchart showing an main part of a braking/driving force control routine in a third embodiment of a vehicle braking/driving force control apparatus.

Although not shown in the figure, in this third embodiment, Steps 10 to 50 and Steps 200 to 220 are executed in the same manner as in the first embodiment or in the second embodiment, and Step 115 is executed in the same manner as in Step 105 in the first or second embodiment.

The vehicle to which the third embodiment is applied may be a vehicle, such as a four-wheel-drive vehicle of a wheel-in-motor type described in the first embodiment, in which a braking/driving force is applied independently to each wheel, or may be a vehicle, such as a four-wheel-drive vehicle in which driving force and regenerative braking force from a single electric motor generator, which is common to four wheels, are controlled so as to be distributed to front and rear wheels and right and left wheels described in the second embodiment, in which a braking force is independently applied to each wheel and a driving force from driving means common to right and left wheels is applied to right and left wheels so as to make the distribution of the driving force to the right and left wheels variable.

Figure 19:
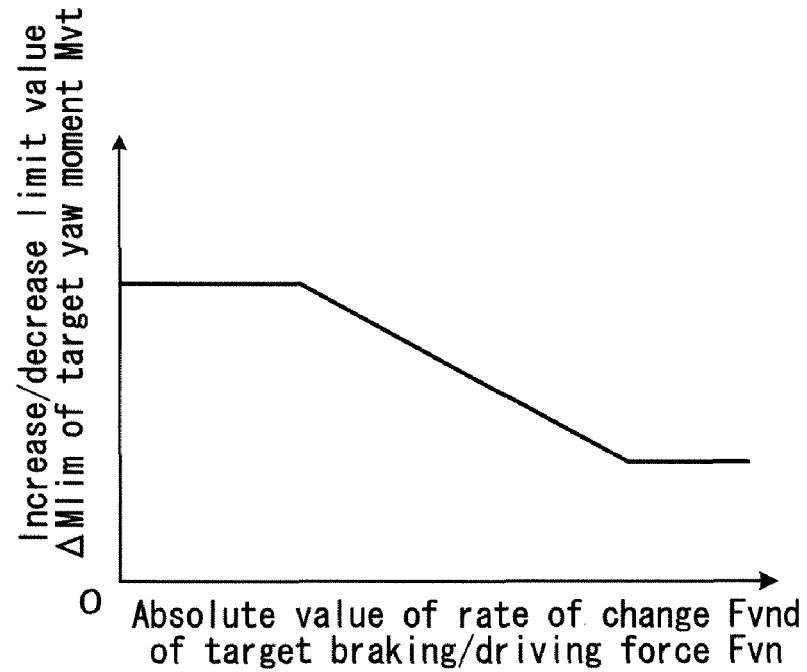
FIG. 19 is a graph showing a relationship between the absolute value of the rate of change Fvnd of the target braking/driving force Fvn and a change limiting value ΔMlim of the vehicle target yaw moment Mvt.

In this third embodiment, after the calculation of the vehicle target braking/driving force Fvt after the modification and the target yaw moment Mvt after the modification is completed at Step 155, the rate of change Fvnd of the target braking/driving force Fvn is calculated as the time-differentiated value of the vehicle target braking/driving force Fvn, and an increase/decrease limit value ΔMlim of the vehicle target yaw moment Mvt is calculated from the map corresponding to the graph shown in FIG. 19 on the basis of the absolute value of the rate of change Fvnd of the target braking/driving force Fvn at Step 160.

Figure 20:
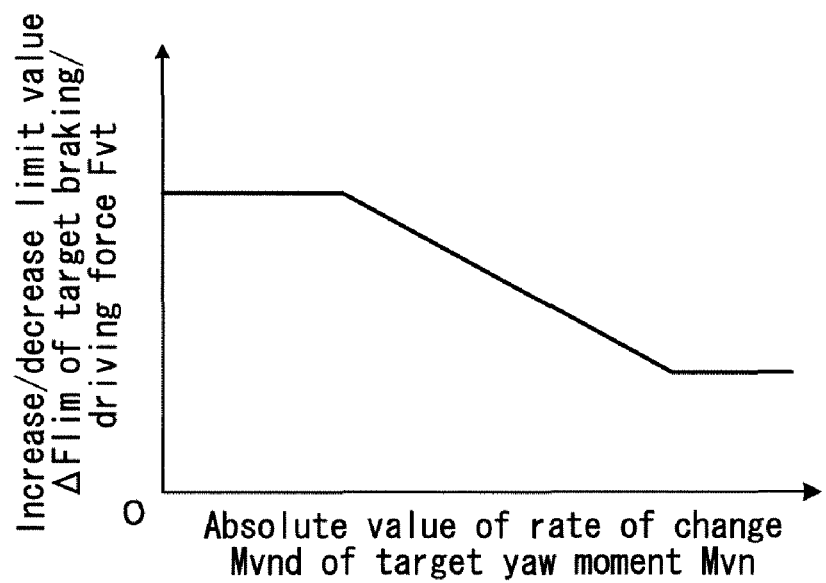
FIG. 20 is a graph showing a relationship between the absolute value of the rate of change Mvnd of the target yaw moment Mvn and a change limiting value ΔFlim of the vehicle target braking/driving force Fvt.

At Step 165, the rate of change Mvnd of the target yaw moment Mvn is calculated as the time-differentiated value of the vehicle target yaw moment Mvn, and an increase/decrease limit value ΔFlim of the vehicle target braking/driving force Fvt is calculated from the map corresponding to the graph shown in FIG. 20 on the basis of the absolute value of the rate of change Mvnd of the target yaw moment Mvn.

At Step 170, the difference between the vehicle target yaw moment Mvt after the modification and its last-time value Mvtf, i.e., an increase/decrease amount ΔMvt of the vehicle target yaw moment Mvt after the modification is calculated, and it is determined whether or not the absolute value of the increase/decrease amount ΔMvt exceeds the increase/decrease limit value ΔMlim. When a negative determination is made, the program proceeds to Step 180. When a positive determination is made, the vehicle target yaw moment Mvt after the modification is corrected to Mvtf+signMvt·ΔMlim at Step 175 with signMvt defined as a sign for the vehicle target yaw moment Mvt. Thereafter, the program proceeds to Step 180.

At Step 180, the difference between the vehicle target braking/driving force Fvt after the modification and its last-time value Fvtf, i.e., an increase/decrease amount ΔFvt of the vehicle target braking/driving force Fvt after the modification is calculated, and it is determined whether or not the absolute value of the increase/decrease amount ΔFvt exceeds the increase/decrease limit value ΔFlim. When a negative determination is made, the program proceeds to Step 200. When a positive determination is made, the vehicle target braking/driving force Fvt after the modification is corrected to Fvtf+signFvt·ΔFlim at Step 185 with signFvt defined as a sign for the vehicle target braking/driving force Fvt. Thereafter, the program proceeds to Step 200.

According to the illustrated third embodiment, the braking/driving forces of the wheels are controlled such that the ratio of the vehicle braking/driving force and the yaw moment surely coincides with the ratio of the target braking/driving force and the target yaw moment, with the result that the braking/driving force and the yaw moment required to the vehicle can be achieved as much as possible within the ranges of the braking/driving forces that can be generated by the wheels, like the above-mentioned first and second embodiments. In addition, according to the third embodiment, the magnitudes of the change amounts of the vehicle target yaw moment Mvt after the modification and the vehicle target braking/driving force Fvt after the modification are limited to be not more than the increase/decrease limit values ΔMlim and ΔFlim respectively per the cycle time in the flowcharts shown in FIGS. 4 and 18. Therefore, under the condition where the rate of change of the magnitude of the vehicle target braking/driving force Fvn or the rate of change of the magnitude of the vehicle target yaw moment Mvn is great, it can surely be prevented that the vehicle target yaw moment Mvt after the modification and/or the vehicle target braking/driving force Fvt after the modification sharply changes to increase or decrease.

According to the above-mentioned each embodiment, the vehicle target longitudinal acceleration Gxt is calculated on the basis of the accelerator opening φ and the master cylinder pressure Pm that indicate the amount of acceleration or deceleration operation by a driver, the vehicle target yaw rate γt is calculated on the basis of the steering angle θ, which is a steering operation amount by a driver, and the vehicle speed V, the target barking/driving force Fvn required to the vehicle is calculated on the basis of the vehicle target longitudinal acceleration Gxt, and the target total yaw moment Mvnt required to the vehicle is calculated on the basis of the vehicle target yaw moment γt.

The vehicle turning yaw moment Ms by the lateral force of each wheel is calculated, and the value obtained by subtracting the turning yaw moment Ms from the vehicle target total yaw moment Mvnt is calculated as the vehicle target yaw moment Mvn, which is required to the vehicle and is to be attained by the control of the braking/driving force of each wheel. Therefore, the vehicle target yaw moment required to the vehicle to be attained by the control of the braking/driving force of each wheel can be surely and correctly calculated in just proportion, compared to the case where the vehicle turning yaw moment Ms attained by the lateral forces of the wheels is not considered.

The present invention is explained in detail with respect to specific embodiments, but the invention is not limited to the above-mentioned embodiments. It would be apparent for a person skilled in the art that various other modifications are possible within the scope of the present invention.

For example, although the regenerative braking force is generated according to need by the electric motor generators 12FL to 12RR and the electric motor generator 40 in the aforesaid embodiments, it may be revised such that the regenerative braking is not performed, even if the driving source is an electric motor generator, and the braking force is generated only by the friction braking.

The longitudinal distribution ratio Kr of the braking/driving force to the rear wheels is constant in the aforesaid embodiments. However, the longitudinal distribution ratio Kr to the rear wheels may be variably set in accordance with the magnitude of the steering angle such that the longitudinal distribution ratio Kr to the rear wheels gradually increases as the magnitude of the steering angle increases, since in general, the lateral force of the steerable wheel increases and the allowable longitudinal force of the steerable wheel decreases as the magnitude of the steering angle increases.

In general, as the braking forces of the rear wheels increase upon the braking of the vehicle for deceleration, the lateral force of the rear wheels decreases to thereby deteriorate the running stability of the vehicle. Therefore, the longitudinal distribution ratio Kr to the rear wheels may be variably set in accordance with the vehicle target braking/driving force such that it decreases as the vehicle target braking/driving force takes a negative value and its magnitude is greater.

In the above-mentioned embodiments, when the vehicle target braking/driving force Fvn and the vehicle target yaw moment Mvn are outside the range of the quadrangle 100 or hexagon 102 that indicates the vehicle target braking/driving force Fvn and the vehicle target yaw moment Mvn that can be achieved by the control of the braking/driving forces of the wheels, the point of intersection Q of the segment L, which links the point P that shows the vehicle target braking/driving force Fvn and the vehicle target yaw moment Mvn and the origin O, and the outer line of the quadrangle 100 or the hexagon 102 is obtained as the target point, and the vehicle target braking/driving force Fvt after the modification and the vehicle target yaw moment Mvt after the modification are set respectively to Fvq and Mvq that are the values at the target point Q. However, the vehicle target braking/driving force Fvt after the modification and the vehicle target yaw moment Mvt after the modification may be obtained in an optional manner, so long as they assume values that are as closer to the vehicle target braking/driving force Fvn and the vehicle target yaw moment Mvn as possible and are on the outer line of the quadrangle 100 or the hexagon 102.

In the aforesaid embodiments, the target braking/driving force Fvn and the target yaw moment Mvn by the control of the braking/driving force of each wheel required to the vehicle are calculated on the basis of the amount of the acceleration or deceleration operation and the amount of the steering operation by the driver. However, in case where the vehicle behavior is unstable, the target braking/driving force Fvn and the target yaw moment Mvn may be corrected so as to be calculated by considering the target longitudinal acceleration or target yaw rate, which are required to stabilize the behavior of the vehicle, in addition to the amount of the acceleration or deceleration operation and the amount of the steering operation by the driver.

The above-mentioned first and second embodiments may be revised such that the Steps same as Steps 160 to 185 in the third embodiment are executed after the completion of Step 135 in the first embodiment or after the completion of Step 145 in the second embodiment, in order that the magnitude of the vehicle target yaw moment Mvt after the modification or the magnitude of the vehicle target braking/driving force Fvt does not sharply change even when the rate of change of the target braking/driving force Fvn or the rate of change of the target yaw moment Mvn sharply changes.

What is claimed is:

1. A vehicle braking/driving force control apparatus comprising:
    braking/driving force applying device that applies braking/driving forces to wheels;
    means for detecting an amount of driving operation by an occupant;
    means for calculating a vehicle target braking/driving force and a vehicle target yaw moment, to be generated by the braking/driving forces of the wheels, on the basis of at least the amount of the driving operation by the occupant;
    modifying means for modifying said target braking/driving force and said target yaw moment such that the target braking/driving force after the modification and the target yaw moment after the modification become values attainable by the braking/driving forces of the wheels, when said target braking/driving force and said target yaw moment cannot be achieved by the braking/driving forces of the wheels; and
    control means for controlling the braking/driving force applied to each wheel by said braking/driving force applying device such that the vehicle braking/driving force and the yaw moment by the braking/driving forces of the wheels become said target braking/driving force after the modification and said target yaw moment after the modification,
    wherein said modifying means suppresses change in said target yaw moment after the modification based on a rate of change in said target braking/driving force under the condition where said target braking/driving force or said target yaw moment cannot be achieved by the braking/driving forces of the wheels.

2. A braking/driving force control apparatus according to claim 1, wherein when the rate of change of said target braking/driving force is great, the degree of the suppression in the change of said target yaw moment after the modification is greater than the case where the rate of change of said target braking/driving force is small.

3. A braking/driving force control apparatus according to claim 2, wherein the degree of the suppression in the change of said target yaw moment after the modification increases as the rate of change of said target braking/driving force increases.

4. A braking/driving force control apparatus according to claim 1, wherein said modifying means suppresses the change in said target yaw moment after the modification by limiting the magnitude of said target yaw moment after the modification.

5. A braking/driving force control apparatus according to claim 4,
    wherein said modifying means suppresses the change in said target yaw moment after the modification by limiting the magnitude of said target yaw moment after the modification to a limit value, and
    wherein said limit value is smaller when the magnitude of the rate of change of said target braking/driving force is great, compared to the case where the magnitude of the rate of change of said target braking/driving force is small.

6. A braking/driving force control apparatus according to claim 1, wherein said modifying means suppresses the change in said target yaw moment after the modification by limiting the rate of change of said target yaw moment after the modification.

7. A braking/driving force control apparatus according to claim 6, wherein said modifying means suppresses the change in said target yaw moment after the modification by limiting the magnitude of rate of change of said target yaw moment after the modification to a limited rate of change, and wherein said limited rate of change is smaller when the magnitude of the rate of change of said target braking/driving force is great, compared to the case where the magnitude of the rate of change of said target braking/driving force is small.

8. A braking/driving force control apparatus according to claim 1, wherein said modifying means suppresses the change in said target yaw moment after the modification when the rate of change of said target braking/driving force is not less than a suppression reference value.

9. A braking/driving force control apparatus according to claim 1, wherein with a point of intersection of a straight line, which links a point that shows said vehicle target braking/driving force and said vehicle target yaw moment and the origin, and a line indicating the greatest values of the vehicle braking/driving force and the yaw moment by the braking/driving forces of the wheels being defined as a target point in a rectangular coordinate with the vehicle driving/braking force and the vehicle yaw moment as coordinate axis, said modifying means sets said target braking/driving force and said target yaw moment to the value at said target point.

10. A braking/driving force control apparatus according to claim 1, wherein said means for calculating a vehicle target braking/driving force and a vehicle target yaw moment calculates said vehicle target braking/driving force and said vehicle target total yaw moment for causing the vehicle to stably run on the basis of at least the amount of the driving operation by an occupant, estimates a vehicle turning yaw moment due to a lateral force of each wheel on the basis of at least the amount of the driving operation by the occupant, and calculates said vehicle target yaw moment by subtracting said turning yaw moment from said target total yaw moment.

11. A braking/driving force control apparatus according to claim 1, wherein a ratio of the braking/driving force and the yaw moment by the braking/driving forces of the wheels coincides with a ratio of the target braking/driving force after modification and the target yaw moment after modification.

12. A vehicle braking/driving force control apparatus comprising:
    braking/driving force applying device that applies braking/driving forces to wheels;
    means for detecting an amount of driving operation by an occupant;
    means for calculating a vehicle target braking/driving force and a vehicle target yaw moment, to be generated by the braking/driving forces of the wheels, on the basis of at least the amount of the driving operation by the occupant;
    modifying means for modifying said target braking/driving force and said target yaw moment such that the target braking/driving force and the target yaw moment after the modification become values attainable by the braking/driving forces of the wheels, when said target braking/driving force and said target yaw moment cannot be achieved by the braking/driving forces of the wheels; and
    control means for controlling the braking/driving force applied to each wheel by said braking/driving force applying device such that the vehicle braking/driving force and the yaw moment by the braking/driving forces of the wheels become said target braking/driving force after the modification and said target yaw moment after the modification, wherein said modifying means suppresses change in said target braking/driving force after the modification based on a rate of change in said target yaw moment under the condition where said target braking/driving force or said target yaw moment cannot be achieved by the braking/driving force of the wheels.

13. A braking/driving force control apparatus according to claim 12, wherein when the rate of change of said target yaw moment is great, the degree of the suppression in the change of said target braking/driving force after the modification is greater than the case where the rate of change of said target yaw moment is small.

14. A braking/driving force control apparatus according to claim 13, wherein the degree of the suppression in the change of said target braking/driving force after the modification increases as the rate of change of said target yaw moment increases.

15. A braking/driving force control apparatus according to claim 12, wherein said modifying means suppresses the change in said target braking/driving force after the modification by limiting the magnitude of said target braking/driving force after the modification.

16. A braking/driving force control apparatus according to claim 15,
    wherein said modifying means suppresses the change in said target braking/driving force after the modification by limiting the magnitude of said target braking/driving force after the modification to a limit value, and
    wherein said limit value is smaller when the magnitude of the rate of change of said target yaw moment is great, compared to the case where the magnitude of the rate of change of said target yaw moment is small.

17. A braking/driving force control apparatus according to claim 12, wherein said modifying means suppresses the change in said target braking/driving force after the modification by limiting the rate of change of said target braking/driving force after the modification.

18. A braking/driving force control apparatus according to claim 17,
    wherein said modifying means suppresses the change in said target braking/driving force after the modification by limiting the magnitude of rate of change of said target braking/driving force after the modification to a limited rate of change, and
    wherein said limited rate of change is smaller when the magnitude of the rate of change of said target yaw moment is great, compared to the case where the magnitude of the rate of change of said target yaw moment is small.

19. A braking/driving force control apparatus according to claim 12, wherein said modifying means suppresses the change in said braking/driving force after the modification when the rate of change of said target yaw moment is not less than a suppression reference value.

20. A braking/driving force control apparatus according to claim 12, wherein a ratio of the braking/driving force and the yaw moment by the braking/driving forces of the wheels coincides with a ratio of the target braking/driving force after modification and the target yaw moment after modification.

* * * * *